(12) United States Patent
Zhao et al.

(10) Patent No.: US 9,542,092 B2
(45) Date of Patent: Jan. 10, 2017

(54) PREDICTION-BASED TOUCH CONTACT TRACKING

(75) Inventors: Weidong Zhao, Redmond, WA (US); David A. Stevens, Sammamish, WA (US); Aleksandar Uzelac, Seattle, WA (US); Hrvoje Benko, Seattle, WA (US); John L. Miller, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/152,991

(22) Filed: Jun. 3, 2011

(65) Prior Publication Data

US 2012/0206380 A1 Aug. 16, 2012

Related U.S. Application Data

(60) Provisional application No. 61/442,222, filed on Feb. 12, 2011.

(51) Int. Cl.
*G06F 3/041* (2006.01)
*G06F 3/0488* (2013.01)

(52) U.S. Cl.
CPC ......... *G06F 3/04883* (2013.01); *G06F 3/0416* (2013.01); *G06F 3/0418* (2013.01); *G06F 3/0488* (2013.01); *G06F 3/04886* (2013.01)

(58) Field of Classification Search
CPC ...... G06F 3/041; G06F 3/0416; G06F 3/0418; G06F 3/04883; G06F 3/0488; G06F 3/04886
USPC .......................................... 345/173; 715/863
See application file for complete search history.

(56) References Cited

U.S. PATENT DOCUMENTS

| 4,421,997 | A | 12/1983 | Forys |
| 5,241,693 | A | 8/1993 | Kim et al. |
| 5,493,294 | A | 2/1996 | Morita |
| 5,825,352 | A | 10/1998 | Bisset et al. |
| 5,856,822 | A | 1/1999 | Du et al. |
| 5,943,043 | A | 8/1999 | Furuhata et al. |
| 5,995,081 | A | 11/1999 | Kato |
| 6,008,636 | A | 12/1999 | Miller et al. |

(Continued)

FOREIGN PATENT DOCUMENTS

| CN | 1242096 | 1/2000 |
| CN | 1761932 | 4/2006 |

(Continued)

OTHER PUBLICATIONS

"Final Office Action", U.S. Appl. No. 12/941,693, (Nov. 26, 2012), 22 Pages.

(Continued)

*Primary Examiner* — Mark Regn
(74) *Attorney, Agent, or Firm* — Timothy Churna; Dan Choi; Micky Minhas

(57) ABSTRACT

In embodiments of prediction-based touch contact tracking, touch input sensor data is recognized as a series of components of a contact on a touch-screen display. A first component of the contact can be identified, and a second component can be determined to correlate to the contact. The first component and the second component can then be associated to represent a tracking of the contact. Subsequent components of the contact can be determined and associated with the previous components of the contact to further represent the tracking of the contact.

16 Claims, 9 Drawing Sheets

(56) References Cited

U.S. PATENT DOCUMENTS

| | | | |
|---|---|---|---|
| 6,091,406 A | 7/2000 | Kambara et al. | |
| 6,218,201 B1 | 4/2001 | Plangger et al. | |
| 6,323,846 B1 | 11/2001 | Westerman et al. | |
| 6,671,406 B1 | 12/2003 | Anderson | |
| 6,741,237 B1 | 5/2004 | Benard et al. | |
| 6,856,259 B1 | 2/2005 | Sharp | |
| 6,977,646 B1 | 12/2005 | Hauck et al. | |
| 7,053,887 B2 | 5/2006 | Kraus et al. | |
| 7,174,649 B1 | 2/2007 | Harris | |
| 7,254,775 B2 | 8/2007 | Geaghan et al. | |
| 7,295,191 B2 | 11/2007 | Kraus et al. | |
| 7,362,313 B2 | 4/2008 | Geaghan et al. | |
| 7,375,454 B2 | 5/2008 | Takasaki | |
| 7,489,303 B1 | 2/2009 | Pryor | |
| 7,580,556 B2 | 8/2009 | Lee et al. | |
| 7,592,999 B2 | 9/2009 | Rosenberg et al. | |
| 7,619,618 B2 | 11/2009 | Westerman et al. | |
| 7,711,450 B2 | 5/2010 | Im et al. | |
| 7,725,014 B2 | 5/2010 | Lam et al. | |
| 7,728,821 B2 | 6/2010 | Hillis et al. | |
| 7,746,325 B2 | 6/2010 | Roberts | |
| 7,797,115 B2 | 9/2010 | Tasher et al. | |
| 7,812,828 B2 | 10/2010 | Westerman et al. | |
| 7,907,750 B2 | 3/2011 | Ariyur et al. | |
| 7,938,009 B2 | 5/2011 | Grant et al. | |
| 7,978,182 B2 | 7/2011 | Ording et al. | |
| 8,061,223 B2 | 11/2011 | Pan | |
| 8,174,273 B2 | 5/2012 | Geaghan | |
| 8,217,909 B2 | 7/2012 | Young | |
| 8,280,119 B2 | 10/2012 | Hamza | |
| 8,314,780 B2 | 11/2012 | Lin et al. | |
| 8,330,474 B2 | 12/2012 | Vandermeijden | |
| 8,493,355 B2 | 7/2013 | Geaghan et al. | |
| 8,725,443 B2 | 5/2014 | Uzelac et al. | |
| 8,773,377 B2 | 7/2014 | Zhao et al. | |
| 8,913,019 B2 | 12/2014 | Zhao et al. | |
| 8,914,254 B2 | 12/2014 | Uzelac et al. | |
| 8,982,061 B2 | 3/2015 | Zhao et al. | |
| 8,988,087 B2 | 3/2015 | Uzelac et al. | |
| 9,030,437 B2 | 5/2015 | Uzelac et al. | |
| 9,122,341 B2 | 9/2015 | Benko et al. | |
| 9,395,845 B2 | 7/2016 | Uzelac et al. | |
| 2003/0164820 A1 | 9/2003 | Kent | |
| 2004/0207606 A1 | 10/2004 | Atwood et al. | |
| 2005/0012724 A1 | 1/2005 | Kent | |
| 2005/0046430 A1 | 3/2005 | Kinnunen et al. | |
| 2005/0063566 A1 | 3/2005 | Beek et al. | |
| 2006/0007177 A1 | 1/2006 | McLintock | |
| 2006/0097991 A1 | 5/2006 | Hotelling et al. | |
| 2006/0139340 A1 | 6/2006 | Geaghan | |
| 2006/0175485 A1 | 8/2006 | Cramer | |
| 2006/0227120 A1 | 10/2006 | Eikman | |
| 2007/0081726 A1 | 4/2007 | Westerman et al. | |
| 2007/0262968 A1 | 11/2007 | Ohshita et al. | |
| 2008/0041639 A1* | 2/2008 | Westerman et al. | 178/18.01 |
| 2008/0062140 A1 | 3/2008 | Hotelling et al. | |
| 2008/0068229 A1 | 3/2008 | Chuang | |
| 2008/0150909 A1 | 6/2008 | North et al. | |
| 2008/0158185 A1 | 7/2008 | Westerman | |
| 2008/0180399 A1 | 7/2008 | Cheng | |
| 2008/0211778 A1 | 9/2008 | Ording et al. | |
| 2008/0211782 A1 | 9/2008 | Geaghan et al. | |
| 2008/0252616 A1 | 10/2008 | Chen | |
| 2008/0277171 A1 | 11/2008 | Wright | |
| 2008/0278453 A1 | 11/2008 | Reynolds et al. | |
| 2008/0284899 A1 | 11/2008 | Haubmann et al. | |
| 2008/0309624 A1 | 12/2008 | Hotelling | |
| 2008/0309629 A1 | 12/2008 | Westerman et al. | |
| 2009/0009483 A1 | 1/2009 | Hotelling et al. | |
| 2009/0046073 A1 | 2/2009 | Pennington et al. | |
| 2009/0096753 A1 | 4/2009 | Lim | |
| 2009/0141046 A1 | 6/2009 | Rathnam et al. | |
| 2009/0157206 A1 | 6/2009 | Weinberg et al. | |
| 2009/0160763 A1 | 6/2009 | Cauwels et al. | |
| 2009/0174679 A1 | 7/2009 | Westerman | |
| 2009/0190399 A1 | 7/2009 | Shibata et al. | |
| 2009/0225036 A1 | 9/2009 | Wright | |
| 2009/0241701 A1 | 10/2009 | Pan | |
| 2009/0250268 A1 | 10/2009 | Staton et al. | |
| 2009/0251435 A1 | 10/2009 | Westerman et al. | |
| 2009/0251436 A1 | 10/2009 | Keskin | |
| 2009/0267903 A1 | 10/2009 | Cady et al. | |
| 2009/0273584 A1 | 11/2009 | Staton et al. | |
| 2009/0289922 A1 | 11/2009 | Henry | |
| 2009/0303202 A1 | 12/2009 | Liu | |
| 2009/0312009 A1 | 12/2009 | Fishel | |
| 2010/0053099 A1 | 3/2010 | Vincent et al. | |
| 2010/0060568 A1 | 3/2010 | Fisher et al. | |
| 2010/0060604 A1 | 3/2010 | Zwart et al. | |
| 2010/0073318 A1 | 3/2010 | Hu et al. | |
| 2010/0103118 A1 | 4/2010 | Townsend et al. | |
| 2010/0103121 A1 | 4/2010 | Kim et al. | |
| 2010/0117962 A1 | 5/2010 | Westerman et al. | |
| 2010/0134429 A1 | 6/2010 | You et al. | |
| 2010/0142765 A1 | 6/2010 | Hamza | |
| 2010/0193258 A1 | 8/2010 | Simmons et al. | |
| 2010/0214233 A1 | 8/2010 | Lee | |
| 2010/0231508 A1 | 9/2010 | Cruz-Hernandez et al. | |
| 2010/0265188 A1 | 10/2010 | Chang et al. | |
| 2010/0277505 A1 | 11/2010 | Ludden et al. | |
| 2010/0302211 A1 | 12/2010 | Huang | |
| 2010/0309139 A1 | 12/2010 | Ng | |
| 2010/0315266 A1 | 12/2010 | Gunawardana et al. | |
| 2010/0315366 A1 | 12/2010 | Lee et al. | |
| 2010/0315372 A1 | 12/2010 | Ng | |
| 2011/0001633 A1 | 1/2011 | Lam et al. | |
| 2011/0018822 A1 | 1/2011 | Lin et al. | |
| 2011/0025629 A1 | 2/2011 | Grivna et al. | |
| 2011/0042126 A1 | 2/2011 | Spaid et al. | |
| 2011/0050620 A1 | 3/2011 | Hristov | |
| 2011/0080348 A1 | 4/2011 | Lin et al. | |
| 2011/0084929 A1 | 4/2011 | Chang et al. | |
| 2011/0106477 A1 | 5/2011 | Brunner | |
| 2011/0115709 A1 | 5/2011 | Cruz-Hernandez | |
| 2011/0115747 A1 | 5/2011 | Powell et al. | |
| 2011/0122072 A1 | 5/2011 | Lin et al. | |
| 2011/0141054 A1 | 6/2011 | Wu | |
| 2011/0163766 A1 | 7/2011 | Geaghan | |
| 2011/0242001 A1 | 10/2011 | Zhang et al. | |
| 2011/0248941 A1 | 10/2011 | Abdo et al. | |
| 2011/0254865 A1 | 10/2011 | Yee et al. | |
| 2011/0261005 A1 | 10/2011 | Joharapurkar et al. | |
| 2011/0267481 A1 | 11/2011 | Kagei | |
| 2011/0298709 A1 | 12/2011 | Vaganov | |
| 2011/0298745 A1 | 12/2011 | Souchkov | |
| 2011/0299734 A1 | 12/2011 | Bodenmueller | |
| 2011/0304577 A1 | 12/2011 | Brown | |
| 2011/0304590 A1 | 12/2011 | Su et al. | |
| 2012/0030624 A1 | 2/2012 | Migos | |
| 2012/0032891 A1 | 2/2012 | Parivar | |
| 2012/0044194 A1 | 2/2012 | Peng et al. | |
| 2012/0065779 A1 | 3/2012 | Yamaguchi et al. | |
| 2012/0065780 A1 | 3/2012 | Yamaguchi et al. | |
| 2012/0068957 A1 | 3/2012 | Puskarich et al. | |
| 2012/0075331 A1 | 3/2012 | Mallick | |
| 2012/0105334 A1 | 5/2012 | Aumiller et al. | |
| 2012/0113017 A1* | 5/2012 | Benko et al. | 345/173 |
| 2012/0131490 A1 | 5/2012 | Lin et al. | |
| 2012/0146956 A1 | 6/2012 | Jenkinson | |
| 2012/0153652 A1 | 6/2012 | Yamaguchi et al. | |
| 2012/0187956 A1 | 7/2012 | Uzelac | |
| 2012/0188176 A1 | 7/2012 | Uzelac | |
| 2012/0188197 A1 | 7/2012 | Uzelac | |
| 2012/0191394 A1 | 7/2012 | Uzelac | |
| 2012/0206377 A1 | 8/2012 | Zhao | |
| 2012/0223894 A1 | 9/2012 | Zhao | |
| 2012/0268416 A1 | 10/2012 | Pirogov et al. | |
| 2012/0280934 A1 | 11/2012 | Ha et al. | |
| 2012/0280946 A1 | 11/2012 | Shih et al. | |
| 2012/0301009 A1 | 11/2012 | Dabic | |
| 2012/0319992 A1 | 12/2012 | Lee | |
| 2013/0016045 A1 | 1/2013 | Zhao et al. | |
| 2013/0063167 A1 | 3/2013 | Jonsson | |
| 2013/0113751 A1 | 5/2013 | Uzelac | |

(56) References Cited

U.S. PATENT DOCUMENTS

| | | | |
|---|---|---|---|
| 2013/0197862 A1 | 8/2013 | Uzelac et al. |
| 2013/0238129 A1 | 9/2013 | Rose et al. |
| 2013/0345864 A1 | 12/2013 | Park |
| 2014/0081793 A1 | 3/2014 | Hoffberg |
| 2014/0354310 A1 | 12/2014 | Hargrove et al. |
| 2015/0160781 A1 | 6/2015 | Uzelac et al. |
| 2015/0193083 A1 | 7/2015 | Uzelac et al. |

FOREIGN PATENT DOCUMENTS

| | | |
|---|---|---|
| CN | 1942853 | 4/2007 |
| CN | 200947594 | 9/2007 |
| CN | 101553777 | 10/2009 |
| CN | 101661373 | 3/2010 |
| CN | 101681219 | 3/2010 |
| CN | 101819496 | 9/2010 |
| CN | 101937296 | 1/2011 |
| CN | 201828476 | 5/2011 |
| CN | 2201903594 | 7/2011 |
| CN | 202093112 | 12/2011 |
| CN | 101545938 | 1/2012 |
| CN | 202171626 | 3/2012 |
| CN | 202196126 | 4/2012 |
| CN | 102436334 | 5/2012 |
| CN | 101982783 | 7/2012 |
| DE | 19939159 | 3/2000 |
| EP | 2077490 | 7/2009 |
| EP | 2284654 | 2/2011 |
| JP | 2003303051 | 10/2003 |
| JP | 2007323731 | 12/2007 |
| KR | 1020050003155 A | 1/2005 |
| KR | 20050094359 | 9/2005 |
| KR | 100763057 | 10/2007 |
| KR | 1020080066416 A | 7/2008 |
| KR | 100941441 | 2/2010 |
| KR | 20100067178 | 6/2010 |
| KR | 20100077298 | 7/2010 |
| KR | 20100129015 | 12/2010 |
| KR | 101007049 | 1/2011 |
| KR | 1020110011337 A | 2/2011 |
| KR | 101065014 | 9/2011 |
| TW | 200925966 | 6/2009 |
| TW | M361674 | 7/2009 |
| TW | M379794 | 5/2010 |
| TW | 201104513 | 2/2011 |
| WO | WO-9938149 | 7/1999 |
| WO | WO-2005114369 | 12/2005 |
| WO | WO-2006042309 | 4/2006 |
| WO | WO-2010073329 | 7/2010 |
| WO | WO-2012150274 | 11/2012 |
| WO | WO-2013063042 | 5/2013 |

OTHER PUBLICATIONS

"International Search Report", Mailed Date: Sep. 3, 2012, Application No. PCT/US2012/024780, Filed Date: Feb. 11, 2012, pp. 9.

Baraldi, Stefano et al., "WikiTable: Finger Driven Interaction for Collaborative Knowledge-Building Workspaces", *Proceedings of the 2006 Conference on Computer Vision and Pattern Recognition Workshop (CVPRW '06)*, available at <<http://ieeexplore.ieee.org/stamp/stamp.jsp?tp=&arnumber=1640590>>,(Jul. 5, 2006), 6 pages.

Binns, Francis S., "Multi-"Touch" Interaction via Visual Tracking", *Bachelor of Science in Computer Science with Honors, The University of Bath*, available at <<http://www.cs.bath.ac.uk/~mdv/courses/CM30082/projects.bho/2008-9/Binns-FS-dissertation-2008-9.pdf>>, (May 2009), 81 pages.

Cao, Xiang et al., "ShapeTouch: Leveraging Contact Shape on Interactive Surfaces", *In Proceedings of TABLETOP 2008*, Available at <http://www.cs.toronto.edu/~caox/tabletop208_shapetouch.pdf>,(2008), pp. 139-146.

Dang, Chi T., et al., "Hand Distinction for Multi-Touch Tabletop Interaction", *University of Augsburg; Institute of Computer Science; Proceedings of the ACM International Conference on Interactive Tabletops and Surfaces*, (Nov. 23-25, 2009), 8 pages.

Dillencourt, Michael B., et al., "A General Approach to Connected-Component Labeling for Arbitrary Image Representations", *Journal of the Association for Computing Machinery*, vol. 39, No. 2, available at <<http://www.cs.umd.edu/~hjs/pubs/DillJACM92.pdf>>,(Apr. 1992), pp. 253-280.

Tao, Yufei et al., "An Efficient Cost Model for Optimization of Nearest Neighbor Search in Low and Medium Dimensional Spaces", *Knowledge and Data Engineering*, vol. 16 Issue:10, retrieved from <<http://www.cais.ntu.edu.sg/~jzhang/papers/ecmonns.pdf>> on Mar. 16, 2011,(Oct. 2004), 16 pages.

Tsuchiya, Sho et al., "Vib-Touch: Virtual Active Touch Interface for Handheld Devices", *In Proceedings of the 18th IEEE International Symposium on Robot and Human Interactive Communication*, Available at <http://www.mech.nagoya-u.ac.jp/asi/en/member/shogo_okamoto/papers/tsuchiyaROMAN2009.pdf>,(Oct. 2009), pp. 12-17.

Westman, Tapani et al., "Color Segmentation by Hierarchical Connected Components Analysis with Image Enhancement by Symmetric Neighborhood Filter", *Pattern Recognition, 1990. Proceedings., 10th International Conference on Jun. 16-21, 1990*, retrieved from <<http://ieeexplore.ieee.org/stamp/stamp.jsp?tp=&arnumber=118219>> on Mar. 16, 2011,(Jun. 16, 1990), pp. 796-802.

Wilson, Andrew D., "TouchLight: An Imaging Touch Screen and Display for Gesture-Based Interaction", *In Proceedings of ICIM 2004*, Available at <http://citeseerx.ist.psu.edu/viewdoc/download-?doi=10.1.1.95.3647&rep=rep1&type=pdf>,(Oct. 2004), 8 pages.

Cao, et al., "Evaluation of an On-line Adaptive Gesture Interface with Command Prediction", Retrieved at <<http://citeseerx.ist.psu.edu/viewdoc/download;jsessionid=DAB1B08F620C23464427932-BAF1ECF49?doi=10.1.1.61.6749&rep=rep1&type=pdf>>, Proceedings of Graphics Interface, 2005, pp. 8.

"Resolving Merged Touch Contacts", U.S. Appl. No. 12/941,693, filed Nov. 8, 2010, pp. 22.

"International Search Report", Application No. PCT/US2011/058855, (Nov. 1, 2011), 8 pages.

"PCT Search Report and Written Opinion", Application No. PCT/US2011/055621, (Jun. 13, 2012), 8 pages.

"Non-Final Office Action", U.S. Appl. No. 12/941,693, (Jul. 18, 2012), 19 pages.

"PCT Search Report and Written Opinion", Application No. PCT/US2012/027642, (Sep. 3, 2012), 9 pages.

"Actuation Force of Touch Screen", *Solutions @ Mecmesin*, retrieved from <http://www.ArticleOnePartners.com/index/servefile?fileld=188971>,(Dec. 31, 2010), 1 page.

"AO Touch Screen Tester", retrieved from <http://www.ao-cs.com/Projects/touch%20screen%20tester%20project.html>, (Dec. 31, 2010), 1 page.

"Capacitive Touch Sensors—Application Fields, Technology Overview and Implementation Example", *Fujitsu Microelectronics Europe GmbH*; retrieved from http://www.fujitsu.com/downloads/MICRO/fme/articles/fujitsu-whitepaper-capacitive-touch-sensors.pdf on Jul. 20, 2011. (Jan. 12, 2010), 12 pages.

"Haptic-Actuator Controllers", retrieved from <http://www.maxim-ic.com/products/data_converters/touch-interface/haptic-actuator.cfm> on May 4, 2011, 1 page.

"How to Use the Precision Touch Testing Tool", retrieved from <http://feishare.com/attachments/article/279/precision-touch-testing-tool-Windows8-hardware-certification.pdf>, (Apr. 15, 2012), 10 pages.

"Input Testing Tool", U.S. Appl. No. 13/659,777, (Oct. 24, 2012), 31 pages.

"Linearity Testing Solutions in Touch Panels", retrieved from <advantech.com/machine-automation/.../%7BDO5BC586-74DD-4BFA-B81A-2A9F7ED489F/>, (Nov. 15, 2011), 2 pages.

"MAX11871", retrieved from <http://www.maxim-ic.com/datasheet/index.mvp/id/7203> on May 4, 2011, 2 pages.

"MicroNav Integration Guide Version 3.0", retrieved from <http://www.steadlands.com/data/interlink/micronavintguide.pdf>, (Dec. 31, 2003), 11 pages.

(56) References Cited

OTHER PUBLICATIONS

"Microsoft Windows Simulator Touch Emulation", retrieved from <blogs.msdn.com/b/visualstudio/archive/2011/09/30/microsoft-windows-simulator-touch-emulation.aspx>, (Sep. 30, 2011), 3 pages.
"Non-Final Office Action", U.S. Appl. No. 12/941,693, (May 16, 2013), 13 pages.
"Non-Final Office Action", U.S. Appl. No. 13/183,377, (Jun. 21, 2013), 10 pages.
"Non-Final Office Action", U.S. Appl. No. 13/293,060, (Jul. 12, 2013), 9 pages.
"OptoFidelity Touch & Test", retrieved from <http://www.ArticleOnePartners.com/index/servefile?fileId=188969, (Feb. 20, 2012), 2 pages.
"OptoFidelity Touch and Test", retrieved from <http://www.ArticleOnePartners.com/index/servefile?fileId=188420>, (May 4, 2012), 2 pages.
"OptoFidelity Two Fingers-robot", video available at <http://www.youtube.com/watch?v=YppRASbXHfk&feature=player_embedded#!section>, (Sep. 15, 2010), 2 pages.
"PCT Search Report and Written Opinion", Application No. PCT/US2012/024781, (Sep. 3, 2012), 9 pages.
"PCT Search Report and Written Opinion", Application No. PCT/US2013/021787, (May 13, 2013), 9 pages.
"Projected Capacitive Test Fixture", retrieved from <http://www.touch-intl.com/downloads/DataSheets%20for%20Web/6500443-PCT-DataSheet-Web.pdf>, (2009), 2 pages.
"Resistive Touch Screen_Resistance Linearity Test", video available at <http://www.youtube.com/watch?v=hb23GpQdXXU>, (Jun. 17, 2008), 2 pages.
"Smartphone Automatic Testing Robot at UEI Booth", video available at <http://www.youtube.com/watch?v=f-Q4ns-b9sA>, (May 9, 2012), 2 pages.
"STM23S-2AN NEMA 23 Integrated Drive+Motor", Retrieved from: <http://www.applied-motion.com/products/integrated-steppers/stm23s-2an> on Jan. 24, 2012, 3 pages.
"Technology Comparison: Surface Acoustic Wave, Optical and Bending Wave Technology", *3M Touch Systems*, Available at >http://multimedia.3m.com/mws/mediawebserver?mwsId=66666UuZjcFSLXTtnXT2NXTaEVuQEcuZgVs6EVs6E666666--&fn=DST-Optical-SAW%20Tech%20Brief.pdf>,(2009), pp. 1-4.
"Touch Panel Inspection & Testing Solution", retrieved from <http://www.ArticleOnePartners.com/index/servefile?fileId=188967>, (Dec. 31, 2010), 1 page.
"Touch Panel Semi-Auto Handler Model 3810", retrieved from <http://www.chromaus.com/datasheet/3810_.en.pdf>, (Dec. 31, 2010), 2 pages.
"Touch Quality Test Robot", U.S. Appl. No. 13/530,692, (Jun. 22, 2012), 20 pages.
"TouchSense Systems Immersion", retrieved from <http://www.ArticleOnePartners.com/index/servefile?fileId=188486>, (Jun. 19, 2010), 20 pages.
"Using Low Power Mode on the MPRO83 and MPRO84", *Freescale Semiconductor Application Note*, Available at <http://cache.freescale.com/files/sensors/doc/app_note/AN3583.pdf>,(Nov. 2007), pp. 1-5.
Asif, Muhammad et al., "MPEG-7 Motion Descriptor Extraction for Panning Camera Using Sprite Generated", *In Proceedings of AVSS 2008*, Available at <http://ieeexplore.ieee.org/stamp/stamp.jsp?tp=&arnumber=4730384>,(Sep. 2008), pp. 60-66.
Brodkin, Jon "Windows 8 hardware: Touchscreens, sensor support and robotic fingers", <<http://arstechnica.com/business/news/2011/09/windows-8-hardware-touch-screens-sensor-support-and-robotic-fingers.ars>> (Sep. 13, 2011), 1 Page.
Buffet, Y "Robot Touchscreen Analysis", <<http://ybuffet.posterous.com/labsmotocom-blog-archive-robot-touchscreen-an>>, (Apr. 19, 2010), 2 Pages.
Cravotta, Robert "The Battle for Multi-touch", *Embedded Insights*, retrieved from <http://www.embeddedinsights.com/channels/2011/04/12/the-battle-for-multi-touch/> on May 4, 2011,(Apr. 12, 2011), 3 pages.
Dillow, Clay "Liquid-Filled Robot Finger More Sensitive to Touch Than a Human's", retrieved from <www.popsci.com/technology/article/2012-06/new-robot-finger-more-sensitive-touch-human> on Jul. 27, 2012, (Jun. 19, 2012), 3 pages.
Hoggan, Eve et al., "Mobile Multi-Actuator Tactile Displays", *In 2nd international conference on Haptic and audio interaction design*, retrieved from <http://www.dcs.gla.ac.uk/~stephen/papers/HAID2.pdf>, (Oct. 29, 2007), 12 pages.
Hoshino, et al., "Pinching at finger tips for humanoid robot hand", Retrieved at <<http://web.mit.edu/zoz/Public/HoshinoKawabuchiRobotHand.pdf>>, (Jun. 30, 2005), 9 Pages.
Kastelan, et al., "Stimulation Board for Automated Verification of Touchscreen-Based Devices", *22nd International Conference on Field Programmable Logic and Applications*, Available at <https://www2.lirmm.fr/lirmm/interne/BIBLI/CDROM/MIC/2012/FPL_2012/Papers/PHD7.pdf>,(Aug. 29, 2012), 2 pages.
Kastelan, et al., "Touch-Screen Stimulation for Automated Verification of Touchscreen-Based Devices", *In IEEE 19th International Conference and Workshops on Engineering of Computer Based Systems*, (Apr. 11, 2012), pp. 52-55.
Khandkar, Shahedul H., et al., "Tool Support for Testing Complex MultiTouch Gestures", *ITS 2010, Nov. 7-10, 2010*, Saarbrucken, Germany, (Nov. 7, 2010), 10 pages.
Kjellgren, Olof "Developing a remote control application for Windows CE", *Bachelor Thesis performed in Computer Engineering at ABE Robotics, Miilardalen University, Department of Computer Science and Electronics*, Retrieved at <<http://www.idt.mdh.se/utbildning/exjobblfiles/TR0661.pdf>>,(May 30, 2007), 43 Pages.
Kuosmanen, Hans "OptoFidelity Automating UI Testing", video available at <http://www.youtube.com/watch?v=mOZ2r7ZvyTg&feature=player_embedded#!section>, (Oct. 14, 2010), 2 pages.
Kuosmanen, Hans "Testing the Performance of Touch-Enabled Smartphone User Interfaces", retrieved from <http://www.ArticleOnePartners.com/index/servefile?fileId=188442>, (Dec. 31, 2008), 2 pages.
Levin, Michael et al., "Tactile-Feedback Solutions for an Enhanced User Experience", retrieved from >http://www.pbinterfaces.com/documents/Tactile_Feedback_Solutions.pdf>, (Oct. 31, 2009), pp. 18-21.
McGlaun, Shane "Microsoft's Surface 2.0 Stress Testing Robot Called Patty Shown off for First Time", Retrieved at <<http://www.slashgear.com/microsofts-surface-2-0-stress-testing-robot-called-patty-shown-off-for-first-time-19172971/>>, (Aug. 19, 2011), 1 Page.
McMahan, William et al., "Haptic Displayof Realistic Tool Contact via Dynamically Compensated Control of a Dedicated Actuator", *International Conference on Intelligent Robots and Systems*, St. Louis, MO, Oct. 11-15, 2009, retrieved from <http://repository.upenn.edu/meam_papers/222>,(Dec. 15, 2009), 9 pages.
Pratt, Susan "Factors Affecting Sensor Response", *Analog Devices, AN-830 Application Note*, Available at <http://www.analog.com/static/imported-files/application_notes/5295737729138218742AN830_0.pdf>,(Dec. 2005), pp. 1-8.
Takeuchi, et al., "Development of a Muti-fingered Robot Hand with Softness changeable Skin Mechanism", *International Symposium on and 2010 6th German Conference on Robotics (ROBOTIC)*, Retrieved at <<http://ieeexplore.ieee.org/stamp/stamp.jsp?arnumber=05756853>>,(Jun. 7, 2010), 7 Pages.
Terpstra, Brett "BetterTouchTool Makes Multi-touch Infinitely More Useful, for Free", retrieved from <http://www.tuaw.com/2010/01/05/bettertouchtool-makes-multi-touch-infinitely-more-useful-for-fr/> on Jul. 20, 2012, (Jan. 5, 2010), 4 pages.
Toto, Serkan "Video: Smartphone Test Robot Simulates Countless Flicking and Tapping", retrieved from <techcrunch.com/2010/12/21/video-smartphone-test-robot-simulates-countless-flicking-and-tapping/>, (Dec. 21, 2010), 2 pages.
Wimmer, Raphael et al., "Modular and Deformable Touch-Sensitive Surfaces Based on Time Domain Reflectrometry", *In Proceedings*

(56) References Cited

OTHER PUBLICATIONS

*of UIST 2011*, Available at <http://www.medien.ifi.lmu.de/pubdb/publications/pub/wimmer2011tdrTouch/wimmer2011tdrTouch.pdf>,(Oct. 2011), 10 pages.

Zivkov, et al., "Touch Screen Mobile Application as Part of Testing and Verification System", *Proceedings of the 35th International Convention*, (May 21, 2012), pp. 892-895.

"Final Office Action", U.S. Appl. No. 13/183,377, (Oct. 15, 2013),12 pages.

"Final Office Action", U.S. Appl. No. 13/293,060, (Sep. 25, 2013),10 pages.

"Non-Final Office Action", U.S. Appl. No. 13/156,243, (Sep. 19, 2013),12 pages.

"Final Office Action", U.S. Appl. No. 12/941,693, Nov. 18, 2013, 21 Pages.

"International Search Report and Written Opinion", Application No. PCT/US2013/061067, Feb. 7, 2014, 11 pages.

"International Search Report and Written Opinion", Application No. PCT/US2013/046208, Sep. 27, 2013, 12 pages.

"Non-Final Office Action", U.S. Appl. No. 13/099,288, Feb. 6, 2014, 13 pages.

"Non-Final Office Action", U.S. Appl. No. 13/154,161, Jan. 3, 2014, 14 pages.

"Non-Final Office Action", U.S. Appl. No. 13/183,377, Feb. 27, 2014, 12 pages.

"Non-Final Office Action", U.S. Appl. No. 13/198,036, Jan. 31, 2014, 14 pages.

"Non-Final Office Action", U.S. Appl. No. 13/293,060, Nov. 29, 2013, 11 pages.

"Notice of Allowance", U.S. Appl. No. 13/156,243, Jan. 28, 2014, 8 pages.

"Notice of Allowance", U.S. Appl. No. 13/198,415, Dec. 26, 2013, 8 pages.

"Foreign Office Action", TW Application No. 101100606, Apr. 15, 2014, 10 pages.

"Corrected Notice of Allowance", U.S. Appl. No. 13/156,243, Jun. 6, 2014, 4 pages.

"Final Office Action", U.S. Appl. No. 13/154,161, Apr. 22, 2014, 16 pages.

"Final Office Action", U.S. Appl. No. 13/530,692, Apr. 10, 2014, 16 pages.

"Foreign Office Action", CN Application No. 201210018527.8, Feb. 24, 2014, 10 Pages.

"Foreign Office Action", CN Application No. 201210029859.6, Feb. 21, 2014, 15 Pages.

"Foreign Office Action", CN Application No. 201210031164.1, Mar. 5, 2014, 14 Pages.

"Non-Final Office Action", U.S. Appl. No. 13/099,288, Jun. 10, 2014, 22 pages.

"Non-Final Office Action", U.S. Appl. No. 13/530,692, Jan. 31, 2014, 14 pages.

"Restriction Requirement", U.S. Appl. No. 13/205,319, May 8, 2014, 6 pages.

"Extended European Search Report", EP Application No. 11840170.2, Jul. 16, 2014, 10 pages.

"Final Office Action", U.S. Appl. No. 13/198,036, Aug. 14, 2014, 17 pages.

"Foreign Notice of Allowance", CN Application No. 201110349777.5, May 28, 2014, 6 pages.

"Foreign Office Action", CN Application No. 201210031164.1, Sep. 11, 2014, 9 Pages.

"Non-Final Office Action", U.S. Appl. No. 13/530,692, Aug. 25, 2014, 18 pages.

"Non-Final Office Action", U.S. Appl. No. 13/205,319, Sep. 9, 2014, 13 pages.

"Non-Final Office Action", U.S. Appl. No. 13/293,060, Jul. 23, 2014, 12 pages.

"Notice of Allowance", U.S. Appl. No. 12/941,693, Aug. 13, 2014, 8 pages.

"Notice of Allowance", U.S. Appl. No. 13/183,377, Jul. 18, 2014, 7 pages.

"Notice of Allowance", U.S. Appl. No. 13/362,238, Jul. 28, 2014, 11 pages.

"Supplemental Notice of Allowance", U.S. Appl. No. 13/362,238, Sep. 18, 2014, 4 pages.

"Advisory Action", U.S. Appl. No. 13/293,060, Mar. 26, 2015, 2 pages.

"Corrected Notice of Allowance", U.S. Appl. No. 13/154,161, Feb. 24, 2015, 2 pages.

"Corrected Notice of Allowance", U.S. Appl. No. 13/205,319, Feb. 26, 2015, 2 pages.

"Foreign Office Action", CN Application No. 201210031164.1, Feb. 16, 2015, 7 Pages.

"Non-Final Office Action", U.S. Appl. No. 13/905,093, Feb. 20, 2015, 18 pages.

"Notice of Allowance", U.S. Appl. No. 12/941,693, Jan. 12, 2015, 8 Pages.

"Notice of Allowance", U.S. Appl. No. 13/530,692, Mar. 3, 2015, 8 pages.

"Corrected Notice of Allowance", U.S. Appl. No. 13/362,238, Nov. 18, 2014, 2 pages.

"Final Office Action", U.S. Appl. No. 13/293,060, Nov. 6, 2014, 14 pages.

"Foreign Notice of Allowance", TW Application No. 101100606, Sep. 29, 2014, 4 pages.

"Foreign Office Action", CN Application No. 201210018527.8, Oct. 29, 2014, 12 pages.

"Foreign Office Action", CN Application No. 201210029859.6, Oct. 17, 2014, 8 Pages.

"Foreign Office Action", CN Application No. 201210446236.9, Dec. 3, 2014, 11 pages.

"Notice of Allowance", U.S. Appl. No. 13/099,288, Oct. 28, 2014, 9 pages.

"Notice of Allowance", U.S. Appl. No. 13/154,161, Nov. 7, 2014, 10 pages.

"Notice of Allowance", U.S. Appl. No. 13/205,319, Dec. 19, 2014, 8 pages.

"Search Report", TW Application No. 101100609, Oct. 16, 2014, 1 page.

"Final Office Action", U.S. Appl. No. 13/905,093, Aug. 19, 2015, 17 pages.

"Foreign Notice of Allowance", CN Application No. 201210031164.1, Jul. 6, 2015, 3 Pages.

"Foreign Office Action", CN Application No. 201210018527.8, Jul. 10, 2015, 13 Pages.

"Non-Final Office Action", U.S. Appl. No. 13/293,060, Jun. 2, 2015, 14 pages.

"Final Office Action", U.S. Appl. No. 13/293,060, Dec. 31, 2015, 17 pages.

"Foreign Notice of Allowance", CN Application No. 201210029859.6, Feb. 6, 2016, 4 Pages.

"Foreign Notice of Allowance", TW Application No. 100135900, Mar. 28, 2016, 4 pages.

"Foreign Office Action", CN Application No. 201210018527.8, Jan. 18, 2016, 15 pages.

"Foreign Office Action", CN Application No. 201210029859.6, Oct. 21, 2015, 7 Pages.

"Foreign Office Action", CN Application No. 201210446236.9, Nov. 13, 2015, 13 pages.

"Non-Final Office Action", U.S. Appl. No. 13/293,060, Apr. 13, 2016, 10 pages.

"Non-Final Office Action", U.S. Appl. No. 13/905,093, Jan. 29, 2016, 17 pages.

"Non-Final Office Action", U.S. Appl. No. 14/662,512, Oct. 5, 2015, 8 pages.

"Notice of Allowance", U.S. Appl. No. 14/662,512, Apr. 19, 2016, 8 pages.

"Final Office Action", U.S. Appl. No. 13/905,093, Jun. 15, 2016, 18 pages.

"Foreign Notice of Allowance", TW Application No. 103124288, Apr. 14, 2016, 4 pages.

(56) References Cited

OTHER PUBLICATIONS

"Foreign Notice of Allowance", CN Application No. 201210446236.9, Apr. 26, 2016, 4 pages.
"Final Office Action", U.S. Appl. No. 13/198,036, Jun. 16, 2016, 41 pages.
"Corrected Notice of Allowance", U.S. Appl. No. 13/205,319, Apr. 2, 2015, 2 pages.
"Corrected Notice of Allowance", U.S. Appl. No. 13/530,692, Apr. 23, 2015, 4 pages.
"Foreign Notice of Allowance", TW Application No. 101100609, Feb. 26, 2015, 4 pages.
"Foreign Office Action", CN Application No. 201210029859.6, Apr. 7, 2015, 8 Pages.
"Non-Final Office Action", U.S. Appl. No. 13/198,036, Apr. 16, 2015, 13 pages.
"Notice of Allowance", U.S. Appl. No. 12/941,693, May 6, 2015, 8 pages.
"Non-Final Office Action", U.S. Appl. No. 14/620,819, Aug. 12, 2016, 22 pages.
"Non-Final Office Action", U.S. Appl. No. 13/198,036, Sep. 9, 2016, 51 pages.
"Extended European Search Report", EP Application No. 12744496.6, Oct. 7, 2016, 8 pages.
"Final Office Action", U.S. Appl. No. 13/293,060, Nov. 14, 2016, 17 pages.

\* cited by examiner

PREDICTION-BASED TOUCH CONTACT TRACKING

RELATED APPLICATION

This application claims priority to U.S. Provisional Application Ser. No. 61/442,222 filed Feb. 12, 2011 entitled "Prediction-Based Touch Contact Tracking" to Zhao et al., the disclosure of which is incorporated by reference herein in its entirety.

BACKGROUND

Portable computing devices, such as mobile phones, portable and tablet computers, entertainment devices, handheld navigation devices, and the like increasingly offer more functions and features which can make it difficult for a user to navigate and select commands that are relevant to a function the user wants to initiate on a device. In addition to the traditional techniques used to interact with computing devices, such as a mouse, keyboard, and other input devices, touch sensors and touch-screen displays are commonly integrated in mobile phones and tablet computers, and are utilized both for display and user-selectable touch and gesture inputs. A continuing design challenge with these types of portable devices having touch sensors and/or touch-screen displays is the touch signal processing to track touch and gesture inputs that are identified from successive frames of sensor image data. Touch contacts on a touch-screen display represent the motion trace of a gesture, such as when a user uses his or her fingers to contact a touch-screen display and gesture while maintaining the contact with the display. A failure to correctly track and interpret the motion trace of a touch contact for a gesture input can lead to the failure of gesture recognition operations and gesture tracking processing.

For a gesture motion that is a relatively small or short gesture, conventional tracking processing may statically match the spatially co-located touch contacts from successive frames. However, this approach is not effective for a gesture motion that is a relatively large or long gesture, such as may be typically used on a tablet computer or other type of slate form factor where fast gestures such as flicker or panning are involved. The tracking processing may not be sensitive to the complete motion of a gesture, which can result in a gesture "break", which may then be recognized and processed as much shorter motion ranges than the actual gesture motion. Alternatively, if the tracking processing is overly sensitive to the gesture motion, this can lead to mis-tracking the touch contacts, such as when a user inputs text with a soft or virtual keyboard that is displayed on a touch-screen display.

SUMMARY

This Summary introduces simplified concepts of prediction-based touch contact tracking, and the concepts are further described below in the Detailed Description and/or shown in the Figures. This Summary should not be considered to describe essential features of the claimed subject matter, nor used to determine or limit the scope of the claimed subject matter.

Prediction-based touch contact tracking is described. In embodiments, touch input sensor data is recognized as a series of components of a contact on a touch-screen display. A first component of the contact can be identified, and a second component can be determined to correlate to the contact. The first component and the second component can then be associated to represent a tracking of the contact. Subsequent components of the contact can be determined and associated with the previous components of the contact to further represent the tracking of the contact.

In other embodiments, a same identifier is assigned to the first component and to the second component of the contact, as well as to the subsequent components that represent the tracking of the contact to associate all of the components with the contact. A predicted component position that is correlated to a subsequent component of the contact can be validated based on a nearest-neighbor criteria that evaluates distance from the predicted component position to one or more additional components of the contact. Additionally, a component can be determined as a component of the contact based on a min-max distance determination between the components of the contact.

BRIEF DESCRIPTION OF THE DRAWINGS

Embodiments of prediction-based touch contact tracking are described with reference to the following Figures. The same numbers may be used throughout to reference like features and components that are shown in the Figures.

DETAILED DESCRIPTION

Embodiments of prediction-based touch contact tracking are described. As noted above, touch and gesture inputs on a touch-screen display of a computing device, such as a mobile phone or portable computer, may not be accurately tracked and/or processed. Prediction-based touch contact tracking uses the prediction of components at touch positions from previous frames, and the tracking can be reliably achieved in the case of high motion while at the same time, mis-tracking in the case of a soft keyboard can be avoided. Touch contact tracking can be based on the predicted positions of previously identified components of a contact, with a set of rules defining the scope of validity of the tracking obtained by the prediction. If a prediction does not exist, a solution is implemented to initiate the prediction via a min-max distance determination (e.g., an algorithm or procedure), and optionally with a penalty term for a tracking crossing.

Embodiments of prediction-based touch contact tracking can include a prediction based two-level procedure for component identification and contact tracking. A first-level of procedure is used to establish an initial association of components of a contact for gesture input tracking based on a prediction, and a second level of procedure is used to validate based on a nearest-neighbor contact mapping criteria to generate a final association of the components of a contact. Also related is a set of rules defining the operations for multi-finger touch and gesture recognition. This may be implemented for any slate based device, tablet device, mobile phone or computer with a touch-screen display, as well as for other similar technologies such as surface, indirect touch, etc.

Embodiments also include a min-max distance determination on contact mapping to both generate the association of components of touch contacts for the prediction residuals, as well as to produce the initial prediction of component position when a prediction is not available. The procedure also accounts for penalizing gesture motion tracks that cross over or through the selection of an initial gesture input tracking. Embodiments also include an approach to process and resolve the case of multiple touch positions that alias to a single component, as well as an approach to process and resolve merge-on-landing when two or more touch positions alias to a single, larger component. An application of the techniques described herein may also be implemented to reduce touch latency by performing look-ahead prediction.

While features and concepts of prediction-based touch contact tracking can be implemented in any number of different devices, systems, environments, networks, and/or configurations, embodiments of prediction-based touch contact tracking are described in the context of the following example devices, systems, and methods.

Figure 1:
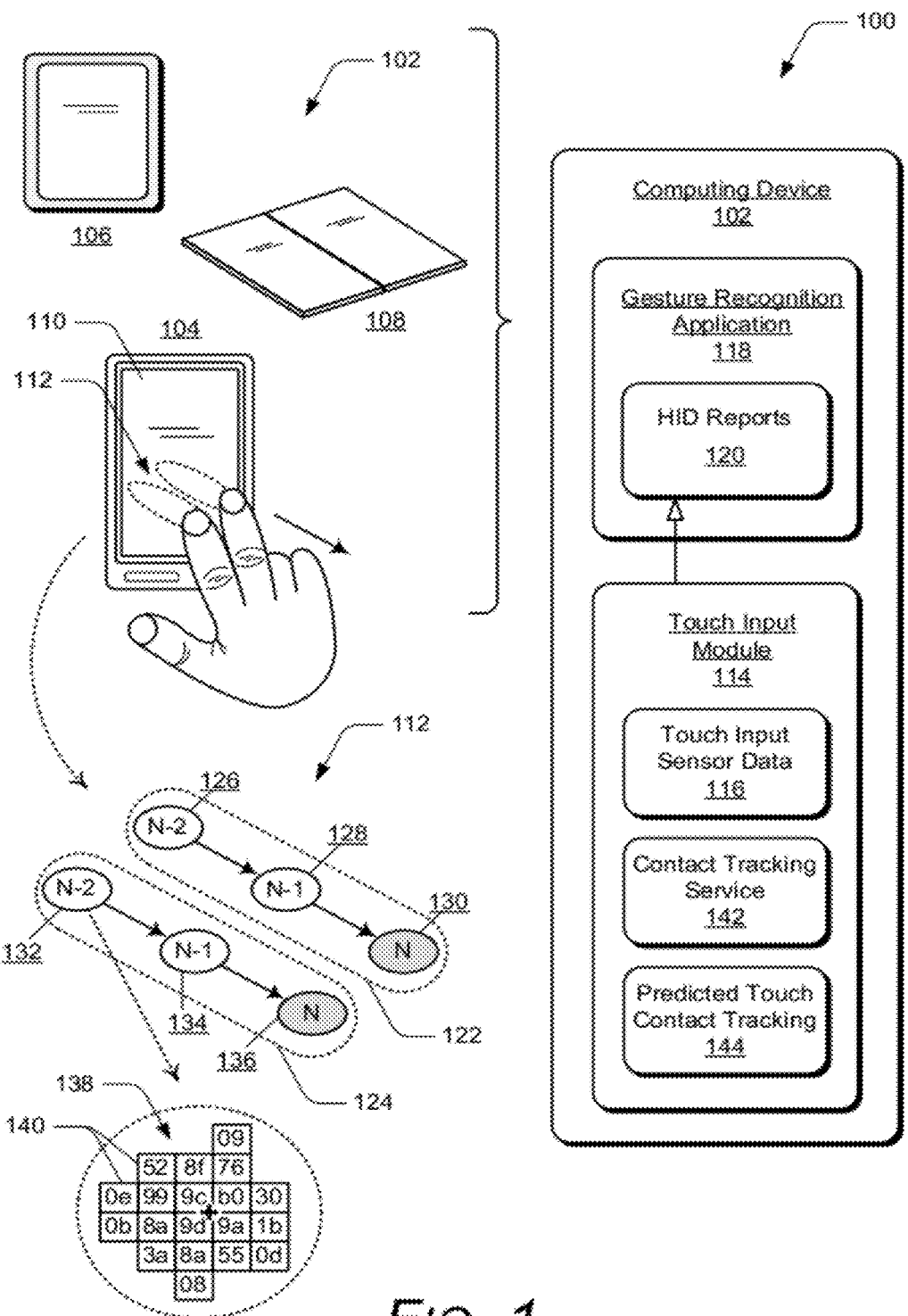
FIG. 1 illustrates an example system in which embodiments of prediction-based touch contact tracking can be implemented.

FIG. 1 illustrates an example system 100 in which various embodiments of prediction-based touch contact tracking can be implemented. The example system includes a computing device 102, which may be any one or combination of a mobile phone 104, entertainment device, navigation device, user device, wireless device, portable device, tablet computer 106, dual-screen folding device 108, and the like. The computing device includes an integrated touch-screen display 110, which is implemented to sense a gesture input 112, such as a user-initiated gesture in a user interface that is displayed on the touch-screen display. In this example, the gesture input is a two finger gesture across the touch-screen display in an approximate direction indicated by the arrow, but may be a single finger gesture input, or a multi-finger gesture input (e.g., three or more finger gesture input). Any of the computing devices can be implemented with various components, such as one or more processors and memory devices, as well as any number and combination of differing components as further described with reference to the example device shown in FIG. 14 to implement embodiments of prediction-based touch contact tracking.

In the example system 100, the computing device 102 includes a touch input module 114 (e.g., a lower layer component) that is implemented to recognize touch input sensor data 116 as the gesture input 112 on the touch-screen display 110. The computing device also includes a gesture recognition application 118 (e.g., a higher layer component) that receives the touch input sensor data from the touch input module as HID reports 120 (i.e., human interface device reports). The HID reports include a time and position data, as well as determined touch contact tracking, that correlates to gesture inputs on the touch-screen display of the computing device. The gesture recognition application 118 is implemented to recognize and generate various gestures as determined from touch input data (e.g. the HID reports 120) associated with inputs or combinations of inputs, such as the gesture input 112. The gesture recognition application can generate various gestures, such as select gestures, hold gestures, motion gestures, tap gestures, and other types of gestures from various user-selectable inputs.

An input recognition system of the computing device 102 may include any type of input detection features and/or devices to distinguish the various types of inputs, such as sensors (capacitive or resistive), light sensing pixels, touch sensors, cameras, and/or a natural user interface that interprets user interactions, gestures, inputs, and motions. In implementations, the input recognition system can detect motion inputs from discernable variables, such as from a direction variable, from start region position variables and end region position variables, and/or from a motion rate variable (e.g., a particular number of pixels per second).

As described herein, a gesture input may be recognized as a user input with one or more fingers on a touch-screen display of a device, and the gesture input includes one or more contacts that each correlate to the input of a finger on the touch-screen display. In the FIG. 1 example, the two-finger gesture input 112 includes two contacts identified as a first contact 122 that correlates to a first finger of the gesture input, and a second contact 124 that correlates to a second finger of the gesture input.

The gesture input data is received as a series of frames, and a frame includes a component that represents one touch position of a contact (e.g., along a gesture input that is one finger). For a two-finger gesture input, a frame can include a component of a first contact that correlates to the input of a first finger, and include a component of a second contact that correlates to the input of a second finger (and so on for more than a two-finger gesture input).

In the FIG. 1 example, the first contact 122 of the gesture input 112 includes successive components, such as component 126, component 128, and component 130 at different touch positions along the first contact. Similarly, the second contact 124 of the gesture input 112 includes successive components, such as component 132, component 134, and component 136 at different touch positions along the second contact. Accordingly, a first frame of the two-finger gesture input includes the component 126 and the component 132 of the respective first and second contacts at N−2 in the series of components. Similarly, a next frame of the gesture input at N−1 includes the component 128 and the component 134 of the respective first and second contacts, and a current frame of the gesture input at N includes the component 130 and the component 136 of the respective first and second contacts.

Therefore, a contact of a gesture input spans multiple frames and includes the components from each successive frame that have been identified as correlating to the contact, or to a section of the contact. A component represents a touch position of a contact in a frame (e.g., after the component has been identified as correlating to the contact). As described in embodiments, a component can be identified as correlating to a particular contact based on a nearest-neighbor contact mapping criteria that evaluates distance between component positions. However, if the nearest-neighbor contact mapping does not identify a component to one of the existing contacts, then a new contact of the gesture input can be generated to represent the tracking of an additional finger used to gesture on the touch-screen display.

The touch input module 114 recognizes the touch input sensor data 116 as the series of components of the two contacts 122, 124 of the gesture input 112 on the touch-screen display 110 of the computing device 102. In embodiments, the touch input module 114 is implemented to generate a sensor map 138 from the touch input sensor data 116 for each component of each contact. A sensor map represents an individual component of a contact, such as when a user initiates the gesture input 112 on the touch-screen display 110. In this example, the sensor map includes elements 140 shown as 8-bit hex values that represent the signal strength at an element position in the sensor map. A stronger sensor signal of the touch input sensor data indicates more touch contact with an element in the sensor map. The sensor map can be generated as a two-dimensional array, and array indices of the elements in the two-dimensional grid correlate to sensed touch contact from the gesture input on the touch-screen display. The stationary baseline level can be subtracted out so that the elements in an area around the sensor map that are not detected as part of the touch contact are normalized to a zero level.

The computing device 102 also includes a contact tracking service 142 that is implemented to determine predicted touch contact tracking 144 that corresponds to one or more contacts of a gesture input on the touch-screen display 110, such as the gesture input 112. The contact tracking service can be implemented as computer-executable instructions, such as a software application, and executed by one or more processors to implement the various embodiments described herein. The contact tracking service can also be implemented as firmware on dedicated sensor device hardware in the computing device. In this example, the contact tracking service is shown implemented as a component of the touch input module 114. Alternatively, the contact tracking service may be implemented as an independent software application or service to predict touch contact tracking.

In embodiments, the contact tracking service 142 is implemented to perform various procedures and/or algorithms of prediction-based touch contact tracking. The contact tracking service can identify and predict components of the gesture input that are mapped (e.g., correlated, associated) as the two contacts. The components 126-130 represent a tracking of the first contact 122, and the components 132-136 represent a tracking of the second contact 124. The components that are identified as correlating to a particular contact are all assigned the same identifier. For example, the components 126-130 of the first contact 122 are all assigned the same first identifier, and the components 132-136 of the second contact 124 are all assigned the same second identifier, where the first and second identifiers are different to distinguish the separate contacts. As further described below, the contact tracking service can validate that a predicted component position correlates to a subsequent component of a contact based on a nearest-neighbor criteria that evaluates distance from the predicted component position to the additional components of the contact. Additionally, the contact tracking service can determine that components correlate to a particular contact based on a min-max distance determination between the components of the contact.

Example methods 200, 1100, 1200, and 1300 are described with reference to respective FIGS. 2, 11, 12, and 13 in accordance with one or more embodiments of prediction-based touch contact tracking. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 2:
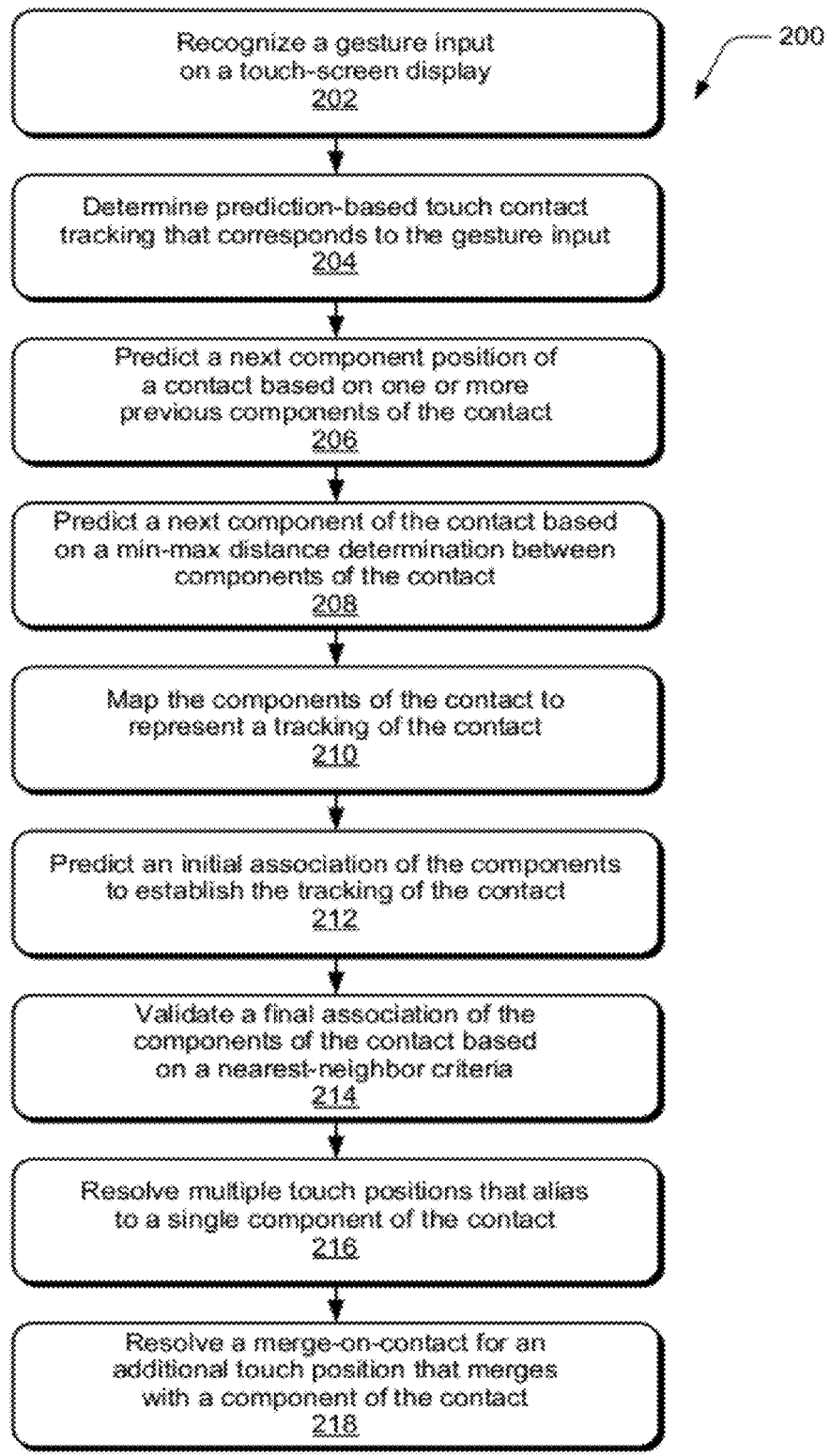
FIG. 2 illustrates example method(s) of prediction-based touch contact tracking in accordance with one or more embodiments.

FIG. 2 illustrates example method(s) 200 of prediction-based touch contact tracking. The order in which the method blocks are described are not intended to be construed as a limitation, and any number of the described method blocks can be combined in any order to implement a method, or an alternate method.

At block 202, a gesture input is recognized on a touch-screen display. For example, the touch input module 114 (FIG. 1) at the computing device 102 recognizes various inputs or combinations of inputs, such as the gesture input 112 on the touch-screen display 110 of the example device 104. In this example, the gesture input 112 is a two-finger gesture input that includes the two contacts identified as the first contact 122 that correlates to a first finger of the gesture input, and the second contact 124 that correlates to the second finger of the gesture input.

At block 204, prediction-based touch contact tracking is determined that corresponds to the gesture input. At block 206, a next component position of a contact is predicted based on one or more previous components of the contact. At block 208, a next component of the contact is predicted based on a min-max distance determination between components of the contact. At block 210, the components of the contact of the gesture input are mapped to represent a tracking of the contact. At block 212, an initial association of the components is predicted to establish the tracking of the contact. At block 214, a final association of the components of the contact is validated based on a nearest-neighbor criteria. At block 216, multiple touch positions that alias to a single component of the contact are resolved. At block 218, a merge-on-contact is resolved for an additional touch position that merges with a component of the contact.

For example, the contact tracking service 142 (FIG. 1) at the computing device 102 determines prediction-based touch contact tracking that corresponds to the gesture input 112 on the touch-screen display 110 of the example device 104. The contact tracking service also predicts a next component position of the contact of the gesture input based on one or more previous components of the contact of the gesture input; predicts a next component of the contact of the gesture input based on a min-max distance determination between components of the contact; maps (e.g., correlates, associates) the components of the contact of the gesture input to represent a tracking of the contact; predicts an initial association of the components to establish the tracking of the contact; validates a final association of the components of the contact based on a nearest-neighbor criteria; resolves multiple touch positions that alias to a single component of the contact; and/or resolves a merge-on-contact for an additional touch position that merges with a component of the contact.

Figure 3:
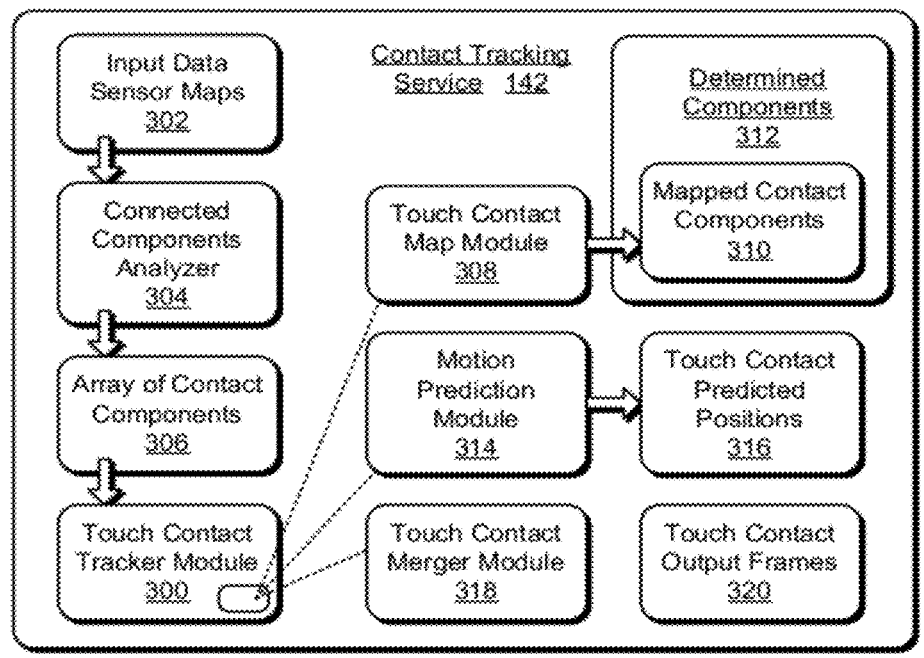
FIG. 3 illustrates an example architecture of a contact tracking service in accordance with one or more embodiments.
Figure 4:
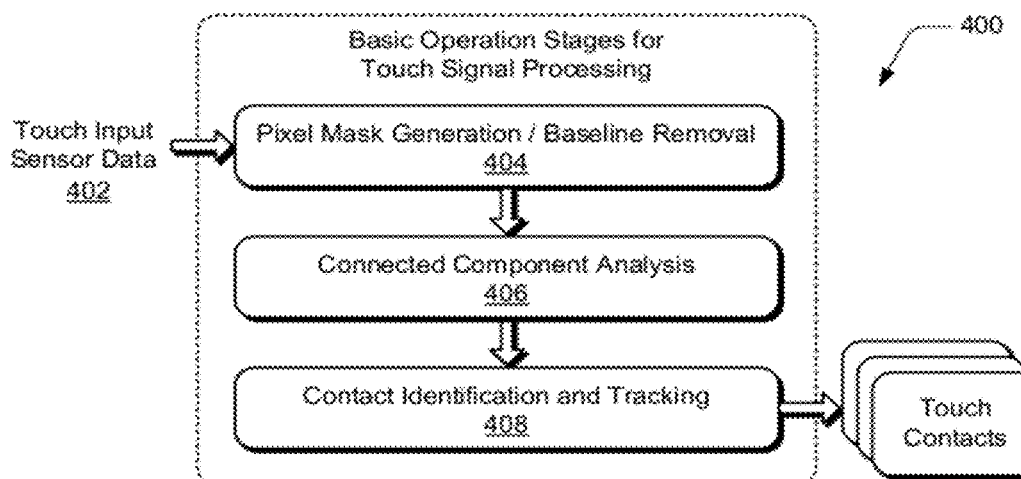
FIG. 4 illustrates an example architecture for processing prediction-based touch contact tracking in accordance with one or more embodiments.
Figure 5:
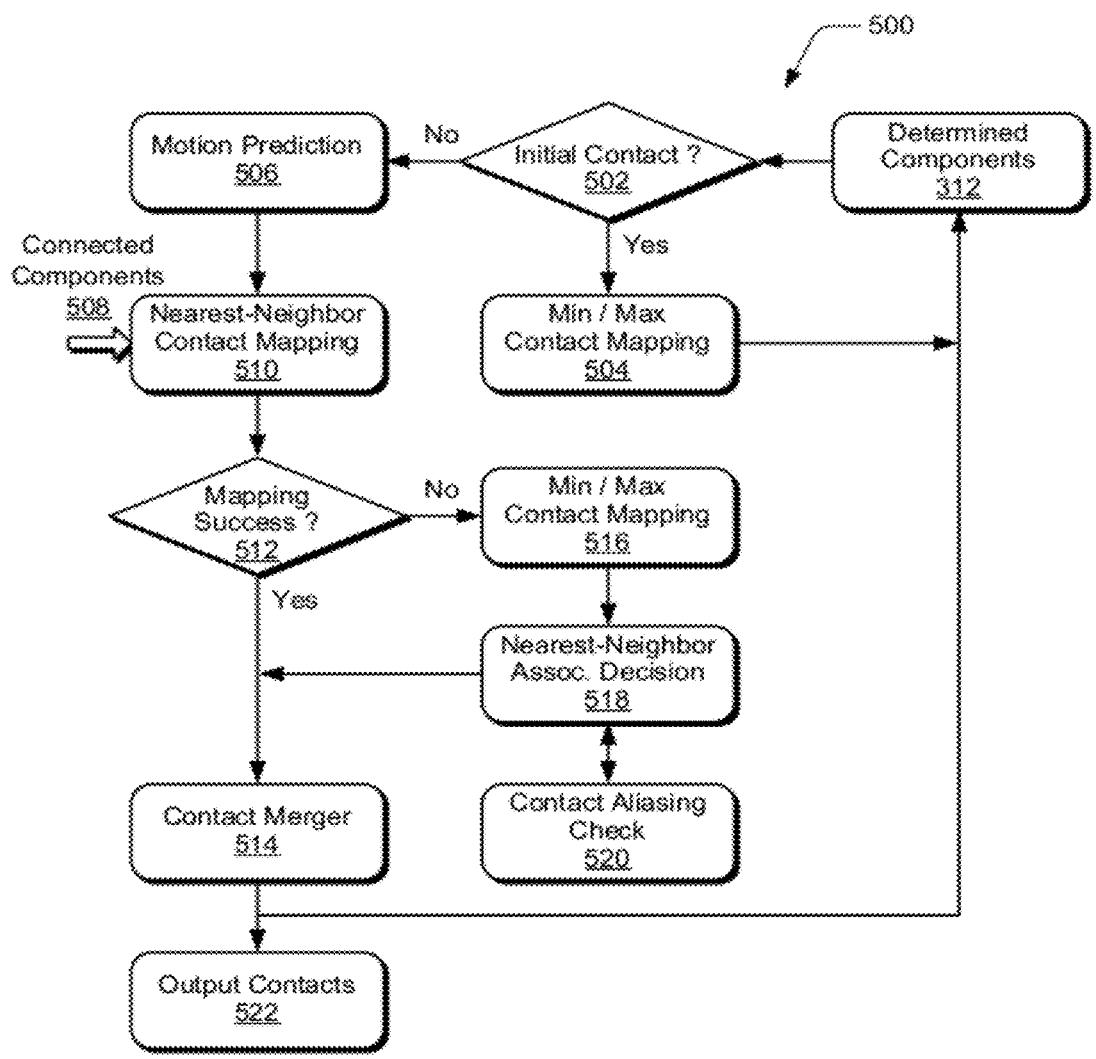
FIG. 5 illustrates a high-level flow diagram for prediction-based touch contact tracking in accordance with one or more embodiments.

FIG. 3 illustrates an example implementation and various components of the contact tracking service 142 that is described with reference to FIG. 1, and which is implemented for touch signal processing. FIG. 4 illustrates an example architecture 400 for processing prediction-based touch contact tracking and is described with reference to the touch input module 114 shown in FIG. 1, and with reference to the contact tracking service 142 shown in FIGS. 1 and 3. FIG. 5 illustrates a high-level flow diagram 500 of prediction-based touch contact tracking implemented by a touch contact tracker module 300 (also referred to as the "contact tracker") that is shown as a component of the contact tracking service 142 in FIG. 3.

Touch input sensor data 116 is input at 402 (FIG. 4) (e.g., received at the touch input module 114), and a sensor unit of the touch input module generates sensor maps 302 (FIG. 3) from the touch input sensor data for each component of a contact of a gesture input. A baseline level can be subtracted out, or otherwise removed, for elements around a sensor map that are normalized to a zero level at 404. For example, the sensor map 138 can be generated as a two-dimensional grid with a pitch of 5 mm and an element depth of eight to sixteen bits. A connected components analyzer 304 is implemented for connected component analysis at 406. The connected components analyzer receives the normalized sensor maps 420 as an input and generates an array 306 of the connected contact components that represent the touch contacts replaced by components of a gesture input. The touch contact tracker module 300 is implemented for component identification and contact tracking at 408 to associate (e.g., correlate or map) the components from previous frames and the components at touch positions in a current frame that represent the traces (e.g., tracking) of a continuous gesture motion, such as the tracking of the first contact 122 and the tracking of the second contact 124.

In FIG. 5, a set of touch contacts from a previous frame are examined for predictability when each new frame is received as input at block 502. Touch contacts that are still in the initial tracking stage (i.e., "yes" from block 502), and before a sufficient history of touch contact association has been established, are input to a touch contact map module 308 (also referred to as the "contact mapper") for min-max contact mapping at block 504. The min-max contact mapping generates an initial association of mapped contact components 310, which are then output and buffered as determined components 312 with a history of association for future frames.

Touch contacts that are not initial touch contacts (i.e., "no" from block 502), such as when at least two previous frames have been received, are input to a motion prediction module 314 for motion prediction at block 506 to generate touch contact predicted positions 316. These touch contact predicted positions, along with the connected components 508 of the current frame, are input into the touch contact map module 308 for nearest-neighbor contact mapping at block 510 based on the nearest-neighbor distance matching algorithm. The result of the nearest-neighbor distance matching is checked against a criterion at 512 to determine whether the components of the current frame have been successfully mapped to previous components of a contact.

If the mapping of the components is successful (i.e., "yes" from block 512), then the mapped association is input to a touch contact merger module 318 at block 514. If the mapping of the components is not successful (i.e., "no" from block 512), then the components are input to the touch contact map module 308 for min-max contact mapping at block 516 and a two-level combinatory mapping is invoked. With the input from the motion prediction module 314 (i.e., as output at block 506) and the connected components 508, the min-max contact mapping attempts to establish a first level association between these two sets of component positions based on a min-max distance determination, along with a set of rules involving hand and/or finger kinematic dynamics. The first level mapping association is then processed at block 518 for nearest-neighbor distance validation of the final determined contact association.

For those contacts that do not have a mapping established at the first level (e.g., at block 518), they are routed over all of the components for a contact aliasing check at block 520 to determine possible aliasing, which may be merged contacts as determined at block 514 by the touch contact merger module 318. A single component may associate to multiple touch contact positions, which can occur when multiple fingers of a gesture input motion move closer to appear as a single component based on the touch input sensor data. To detect a touch contact merger, for any unmapped component after a first-level contact association, a nearest-neighbor verification can be initiated for contact associations for all of the components, and any match indicates an aliased association between a single component and multiple touch positions.

The touch contact merger module 318 processes and resolves the merged components, such as to independently check whether two touch positions have the same [x,y] grid point coordinates. A contact merger may include multiple touch positions aliased to one component, as well as a scenario of merge-on-landing when a first touch position is already sensed or detected as a first finger touches on a touch-screen display and a user lands a second finger closely next to the first one. The two touch positions may then be detected as merged together in one larger component.

Figure 6:
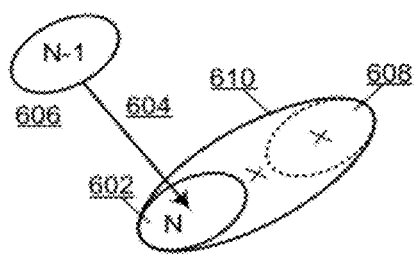
FIG. 6 illustrates an example of a merge-on-landing in accordance with one or more embodiments.

FIG. 6 illustrates an example 600 of a merge-on-landing with a component 602 from a current frame in a first contact tracking 604 that associates with a component 606 from a previous frame. The example also illustrates an aliasing touch position 608 that is detected as having merged together with the other component 602 to form the one larger component 610. The merge-on-landing can be detected by evaluating conditions and characteristics of the merge-on-landing. For example, the contact-to-component mapping is 1-to-1 (i.e., no contact aliasing exists); the projected touch position is within the area of the component; the size of the component is substantially larger than the size of the contact; and the predicted position is off from the center of mass of the component, but is still within the area of the component.

Alternatively, when the contact has a high velocity, the span of the component is substantially greater than the span of the contact when both are projected to the direction normal to the velocity; and when the contact has a high velocity, the predicted position is off from the center of mass of the component—all after being projected to the direction normal to the velocity. When these conditions are all met, another contact can be generated with its center positioned diagonally to the original contact across the center of mass of the component, and this new contact is the aliasing to the component.

To resolve a merge-on-landing, the contact tracking service 142 can attempt to resolve the two touch positions in the one component 610 and track them in the merged state, as described below in a probabilistic approach. Alternatively, the contact tracking service can determine the first touch position of the component 602 based on initial touch input sensor data for the merged component and resolve the second touch position 608 as being any new touch input sensor data of the merged component.

Figure 7:
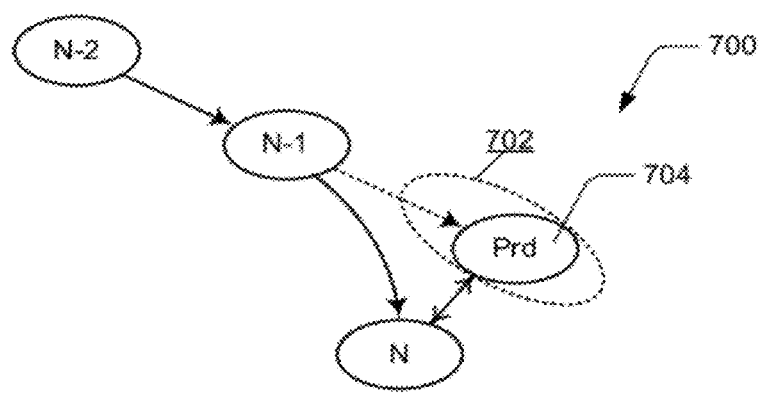
FIG. 7 illustrates an example of motion prediction for a decision region in accordance with one or more embodiments.

FIG. 7 illustrates an example 700 of motion prediction for a decision region 702 that represents a predicted component position 704 of a contact given the tracking of the contact, such as a contact of the gesture input 112 on the touch-screen display 110 of the example device 104 (FIG. 1). In embodiments, the motion prediction module 314 (FIG. 3) of the contact tracking service 142 is implemented for motion prediction when the gesture input begins on the touch-screen display at position N−2 and continues the tracking of the contact to position N−1 and then to position N. The component at position N is determined as the component that is associated with the components at N−2 and N−1 based on proximity to the predicted component position 704. When there is an association for a component identified as i in previous N-frames, then the position of the component in the current frame of $X_i$ can be predicted thru a linear combination of the previous component positions of the contact, as in the following equation:

$$\widehat{X}_i(t) = \sum_{k=1}^{N} a_k X_i(t-k)$$

If N=3 for example, one solution is a constant a1=2.5, a2=−2, and a3=0.5 determined via the simple constant acceleration condition. If N=2 for example, then a solution is a1=2 and a2=−1. In general, these coefficients may be time-dependent variables and a more advanced technique, such as a Kalman filter, can be utilized to determine the parameters through an iterative procedure.

For each component $\hat{X}_1(t)$ of the $i^{th}$ touch position generated in the prediction stage above, the nearest-neighbor contact mapping attempts to associate a component X(t) of the current frame. A nearest-neighbor contact mapping can be resolved as described herein and/or with other techniques and algorithms. A mapped association can be established when all of the components of a current frame are considered to determine a component with an X(t) that is within the two-dimensional decision region 702 centered around the predicted position $\hat{X}_1(t)$. The decision region can be constructed first with a round shape of radius r which corresponds to an area matching the actual touch shape of the ith contact at the frame t−1. The round shape region is then modified with a velocity related expansion along the direction of the velocity, and with an expansion factor λ proportional to the norm of the velocity. This expansion accounts for the error introduced by the inaccuracy of the velocity prediction. In general, λ can have an upper bound λmax to avoid erroneous association between fingers of a gesture input motion that are close together along the direction of the velocity. In one implementation, λ=(1+λmax|v|)/(1+|v|), however other choices for are also possible.

In practice, the procedure of verifying the nearest-neighbor contact mapping criterion can be performed in a reverse procedure. A difference vector: d=X(t)−$\hat{X}_1(t)$ is computed first, and then a reverse scaling on d is performed with the factor 1/λ along the direction of velocity vector: v=X(t−1)−X(t−2). The norm of the resultant vector $\tilde{d}$ is then checked against the radius r of the decision region, and a value smaller than r indicates that an association has been determined. Another extension of the nearest-neighbor contact mapping is to implement a probabilistic approach, where a probability distribution function of the vector d is defined, and instead of passing a hard decision of which touch the component X(t) belongs to, a probability distribution is passed among all of the components. This information can be passed through the HID reports so that the gesture recognition application 118 (FIG. 1) (e.g., a higher layer) can utilize the information.

In embodiments, criteria that nearest-neighbor contact mapping is successful can be established, such as to determine a successful mapping at block 512 (FIG. 5). Generally, the nearest-neighbor contact mapping generates a reliable touch component association. However, in some distributions of touch contact velocity, an unreliable association may be determined, such as when the velocities of the touch positions involved are fast and with substantial acceleration in certain directions. The resulting predicted component locations become closer to that of neighbored components rather than the tracking contact component that should be associated with the predicted component.

A simple condition to detect this instance of an unreliable association is to determine that the total number of unassociated components after the nearest-neighbor mapping is greater than the difference between the number of components and the number of touches. Note that this is a sufficient condition in that, theoretically, there may be good mappings classified as a bad mapping. Since the majority of frames have reliable association predictions, the instances of an unreliable association (e.g., a failure case) will likely be of a very small percentage (e.g., less than 5%) with a negligible computational cost. If a failure case is detected, an algorithm or procedure for combinatory contact mapping can be invoked to determine a correct association, as implemented by the touch contact map module 308 of the contact tracking service.

The combinatory contact mapping can establish a reliable mapping between a given set of contacts established in a previous frame and a given set of components in the current frame. When a prediction is determined and the nearest-neighbor contact mapping fails, the combinatory contact mapping can be used to establish a first-level association between the two sets (e.g., the touch positions and the components) by matching the prediction residuals between the prediction positions and that of the components. When a prediction is not determined at the initial phase of a contact life span, the combinatory contact mapping can also be used to establish the initial association. If an initial association of a contact does not exist, as may happen in the first two frames of a new contact, the touch contact map module 308 can then set the original position as the predicted position, and no prediction residual is present. The touch contact map module can include the combinatory contact mapping algorithm, the min-max distance determination algorithm for distance mapping, and a cross-trajectory suppressor for penalizing trajectories of gesture input motions that cross each other. The combinatory contact mapping algorithm can be implemented as described herein via a min-max algorithm and/or with other techniques and algorithms, such as the Hungarian Algorithm.

In embodiments, a nearest-neighbor verification for contact and component association can be implemented. The first-level association that is established with a min-max distance determination (as further described below) can be evaluated with a second-level verification process, which is similar to nearest-neighbor contact mapping. Specifically the component $X(t)$ of the current frame, after the establishment of the initial association to $\hat{X}_1(t)$ at the min-max mapping stage, is confirmed to belong to the $i^{th}$ contact if $X(t)$ falls into a two-dimensional predicted region centered around the predicted position $\hat{X}_1(t)$ of the $i^{th}$ contact. Generally, a difference to the nearest-neighbor contact mapping is that instead of evaluating all of the possible components for a given $\hat{X}_1(t)$, a component with the first-level association is selected for the verification process.

Figure 8:
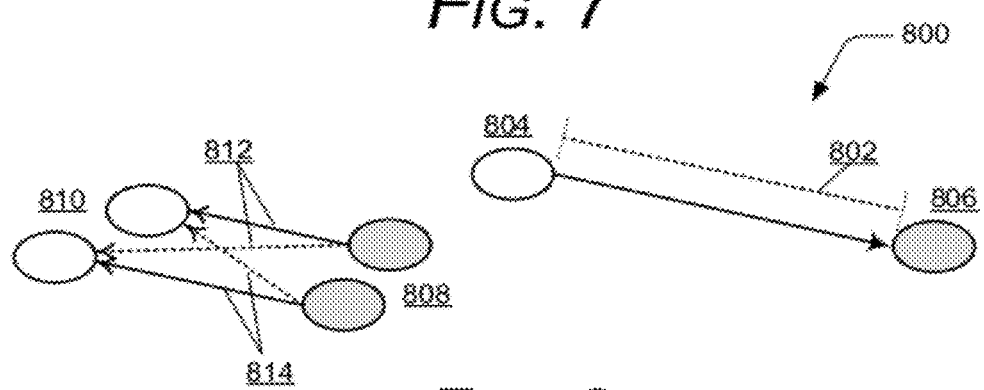
FIG. 8 illustrates an example of min-max distance determination for a multiple level maximum distance determination in accordance with one or more embodiments.

FIG. 8 illustrates an example 800 of min-max distance determination for a multiple level maximum distance determination. In embodiments, the touch contact map module 308 (FIG. 3) of the contact tracking service 142 is implemented to determine an optimal mapping to associate (e.g., determine, correlate) the components of a previous frame to the components of a current frame such that the maximum distance between all mapping pairs within the mapping is minimized. Depending on how the min-max distance determination is applied, the position of a component of the previous frame that is being mapped from may be the predicted position of a component in a subsequent frame.

The min-max distance determination seeks to determine the mapping that has the smallest maximum distance between the components of a previous frame and the components of a current frame. In this example, a maximum distance 802 from a component 804 to a touch position 806 of a subsequent component has already been identified. A mapping is then determined from components 808 in a current frame to components 810 in a previous frame. For example, the determination for a first contact is whether to select the component association represented by the dashed line or the solid line at 812, and the determination for a second contact is whether to select the component association represented by the dashed line or the solid line at 814.

In an equation, P(i) defines a mapping from N to M where N represents the set of numerical labels on the contacts from a previous frame, and M represents the labels of the components in a current frame. More specifically, P(i) is a function of i∈N (range 0 ... N−1) taking the value in M (range 0 ... M−1), such that P(i)≠P(j) for i≠j. Furthermore, P denotes the entire set of all possible P(i), and the best P(i) within P is determined so that the mapping defines an association of current components with previous touch positions that makes the most sense.

For any P(i) in P, an array D(i,P): i∈N denotes the distances for each pair i in the mapping. More specifically, for each pair i in the mapping, the distance D(i,P) is defined as the $L^2$ distance between the position of the component of the current frame and the predicted position of the component of the previous frame if the prediction exists, or the position of the component of the previous frame. A descending sort of array of D(i,P) is then initiated and the result is denoted as Sorted D(k,P), where 0≤k<N and:

Sorted$D(0,P)$≥Sorted$D(1,P)$ ... ≥Sorted$D(N-1,P)$

The best P can be obtained when solving the following minimization problem: BestP=argmin$_{P \in P}$(ED(P)+$\lambda_0$*EC(P)); where:

$$ED(P) \stackrel{def}{=} \sum_{k=0}^{N-1} (SortedD(k, P) * MAXD^{N-k})$$

The value ED is the contribution from the maximum distance matching, and the value MAXD is the maximum distance on the display screen (typically the diagonal distance). The layered maximum distance matching in this example accounts for the degeneracy of the configuration once the components with larger distances have been matched.

Figure 9:
FIG. 9 illustrates an example of crossing trajectories that may indicate unwanted component associations in accordance with one or more embodiments.

FIG. 9 illustrates an example 900 of crossing trajectories that may indicate unwanted associations between components 902 in a current frame and components 904 from a previous frame. A min-max distance determination may incorrectly associate a current component to a previous component. A value EC(P) is defined as being proportional to the number of crossings in trajectory for all pairs of labels in the mapping P, and at a sampling rate of approximately 100 Hz, a crossing can be regarded as spurious mapping. In this example, the matching of component A to component C, and component B to component D is preferred over the crossing trajectories of components A to D and B to C. However, without EC(P), a pure ED(p) would likely incorrectly associate the crossing trajectories of components A to D and B to C, which is clearly undesired.

Figure 10:
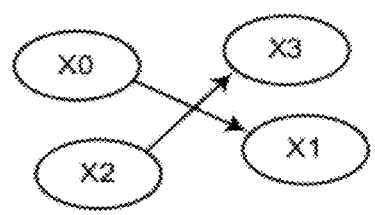
FIG. 10 illustrates an example of how to compute and account for crossing trajectories as shown in FIG. 9 in accordance with one or more embodiments.
Figure 11:
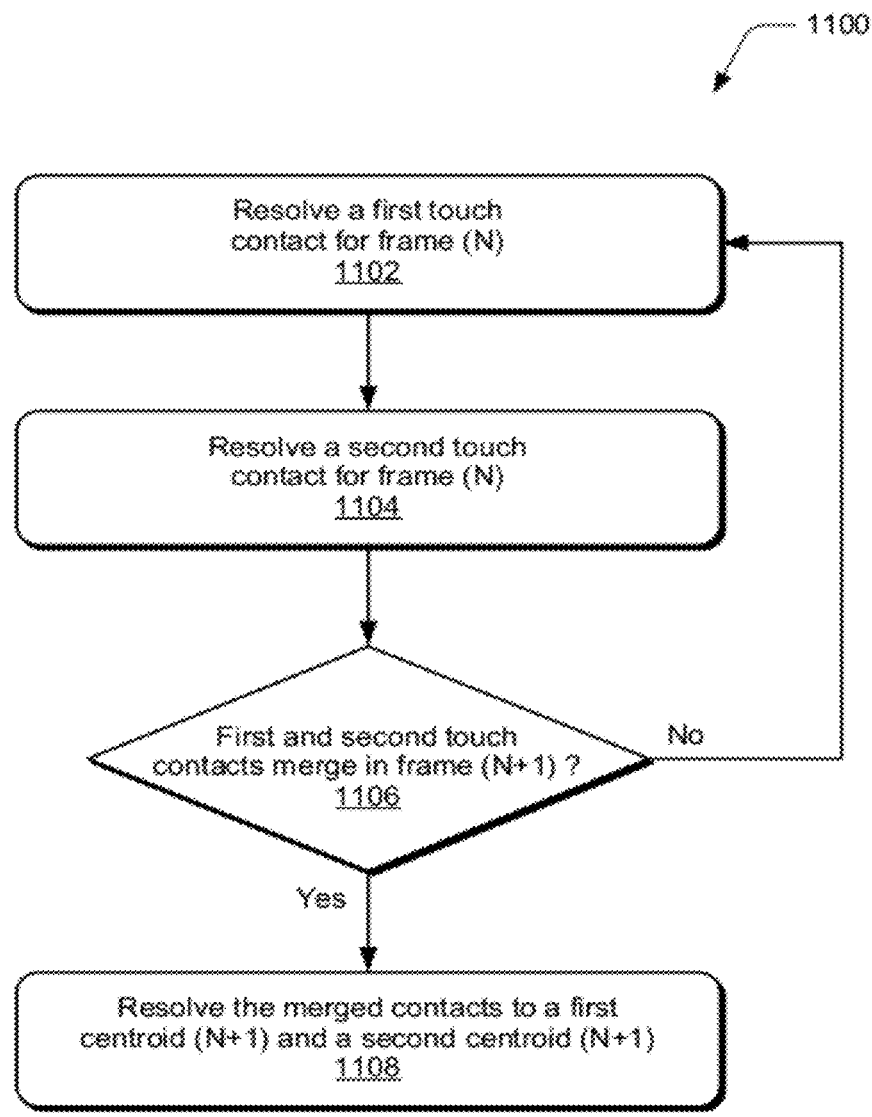
FIG. 11 illustrates example method(s) of prediction-based touch contact tracking in accordance with one or more embodiments.

FIG. 10 illustrates an example 1000 of how to compute and account for crossing trajectories, such as shown in FIG. 9. A computation of EC considers that for the pair of trajectories $\overline{x_0 x_1}$ and $\overline{x_2 x_3}$, the condition where they cross each other is when the following inequalities hold true simultaneously:

$0<(b_1*c_0-b_0*c_1)/\det<1$ $0<(a_0*c_1-a_1*c_0)/\det<1$ $(\det=b_1*a_0-b_0*a_1)$; where $a=(a_0,a_1)=x_1-x_0$ $b=(b_0,b_1)=x_2-x_3$ $c=(c_0,c_1)=x_2-x_0$ FIG. 11 illustrates example method(s) 1100 of prediction-based touch contact tracking. The order in which the method blocks are described are not intended to be construed as a limitation, and any number of the described method blocks can be combined in any order to implement a method, or an alternate method.

The aliased touch positions of two contacts shown in the example 600 (FIG. 6) of a touch merger can be resolved utilizing a probability distribution to partition the one larger component 610 so that each contact (e.g., the contact 602 and the contact 608) can be associated to a separate portion of the component. In embodiments, the contact tracking service 142 can resolve the first component to a first contact (i.e., centroid) of a frame (N), and resolve the second component, distinct from the first component, to a second contact of the frame (N). When the first and second contacts merge into the larger component in a subsequent frame (N+1), the larger merged component is resolved to a first contact and a second contact. Any number of merged contacts may be resolved.

At block 1102, tracking methods are utilized to resolve a first touch position to a first centroid(N) for a frame (N). At block 1104, a second touch position, distinct from the first touch position, is resolved to a second centroid(N) for the frame(N). The tracking continues to a subsequent frame (N+1) if the first touch position and second touch position remain distinct. However, if the first touch position and the second touch position merge into a larger component in the subsequent frame (N+1), as determined at block 1106, the merged touch positions are resolved to a first centroid (N+1) and a second centroid (N+1) at block 1108.

At block 1108, a method can be initiated to identify a continuous component in frame (N+1) having a combined statistic approximately equal to a sum of an individual statistic of the first contact and an individual statistic of the second contact from frame (N). A non-limiting example of such a statistic is the area of the overall component. For example, if the area of a merged component in frame (N+1) is approximately equal to the combined area of the separate contacts in frame (N), the merged component may be verified. Alternatively or in addition, a continuous contact may be verified if the covariance of the merged component is substantially equal to the combined covariance of the individual contacts in a previous frame. The method 1100 may also be initiated for a merge-on-landing when two contacts are aliased to a single, larger component, and block 1104 is skipped when the second contact is not identified as a separate contact, but rather is aliased in the larger component to the first contact.

Figure 12:
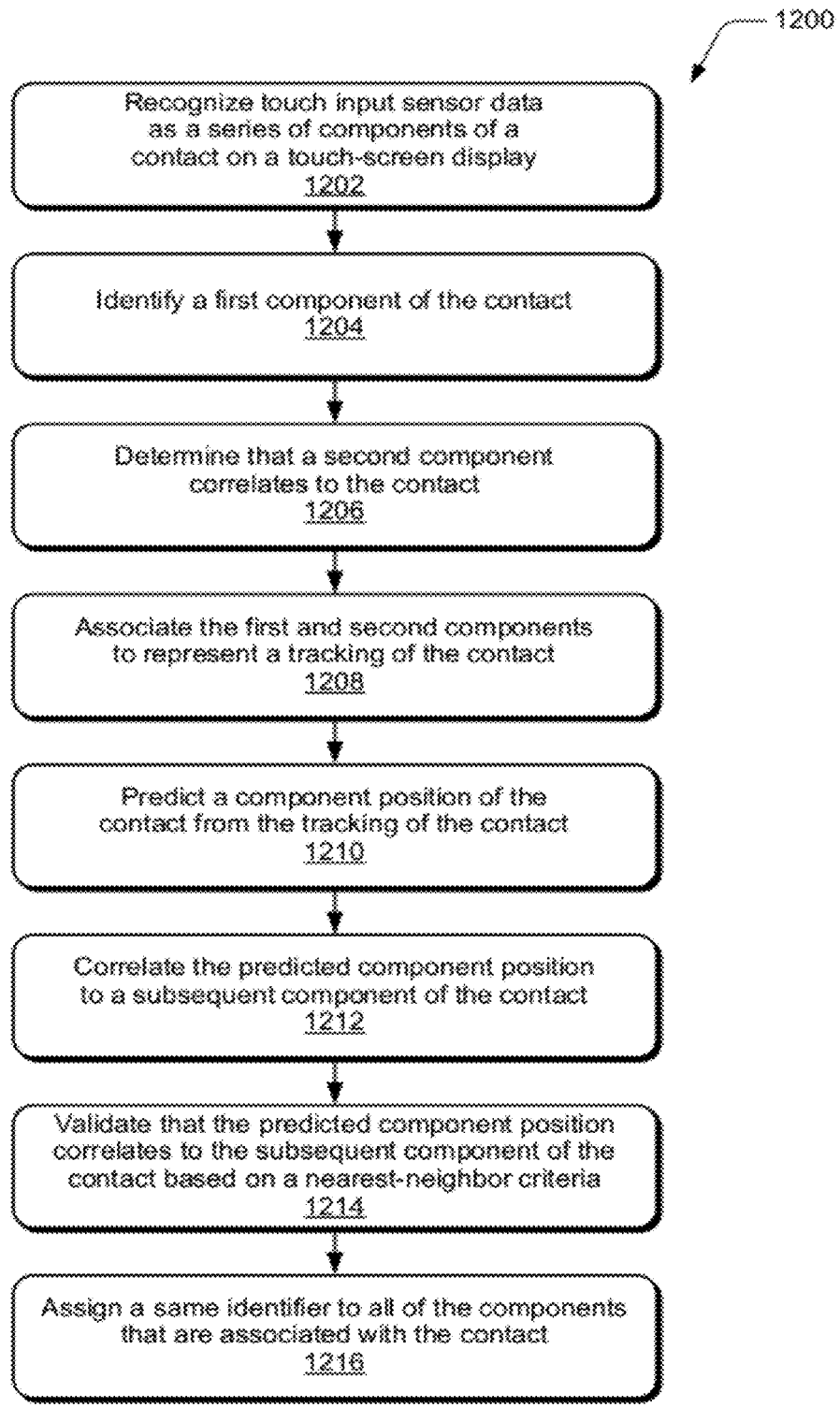
FIG. 12 illustrates example method(s) of prediction-based touch contact tracking in accordance with one or more embodiments.

FIG. 12 illustrates example method(s) 1200 of prediction-based touch contact tracking, such as for a single contact of a gesture input. The order in which the method blocks are described are not intended to be construed as a limitation, and any number of the described method blocks can be combined in any order to implement a method, or an alternate method.

At block 1202, touch input sensor data is recognized as a series of components of a contact on a touch-screen display. For example, the touch input module 114 (FIG. 1) at the computing device 102 recognizes the touch input sensor data 116 as the series of components of a contact (e.g., either of the two contacts 122, 124) of the gesture input 112 on the touch-screen display 110, such as on the example device 104.

At block 1204, a first component of the contact is identified. At block 1206, a second component is determined that correlates to the contact. At block 1208, the first component and at least the second component are associated to represent a tracking of the contact. For example, the contact tracking service 142 (FIG. 1) at the computing device 102 identifies a first component 126 of the contact 122 from a first frame, predicts a position for a subsequent component of the contact initiate a second frame and determines a second component 128 that correlates to the contact from the second frame, and associates the first component and at least the second component to represent a tracking of the contact if a nearest-neighbor criterion is passed. If the nearest-neighbor criterion is not passed, then the subsequent component from the second frame is initiated as a touch position of a new contact, and the previous contact is terminated. In an embodiment, the contact tracking service 142 determines that the second component correlates to the contact based on a min-max distance determination between the first and second components of the contact.

At block 1210, a component position of the contact is predicted from the tracking of the contact. For example, the contact tracking service 142 predicts a component position of the contact from the tracking of the contact (e.g., based on previous components of the contact that represent the contact tracking). At block 1212, the predicted component position is correlated to a subsequent component of the contact. At block 1214, the predicted component position is validated as correlating to the subsequent component of the contact based on a nearest-neighbor criteria. For example, the contact tracking service 142 validates the predicted component position as correlating to the subsequent component of the contact based on a nearest-neighbor contact mapping that evaluates distance from the predicted component position to one or more additional components of the contact. At block 1216, a same identifier is then assigned to all of the components that are associated with the contact. For example, the contact tracking service 142 also assigns the same identifier to the subsequent components that represent the tracking of the contact.

Figure 13:
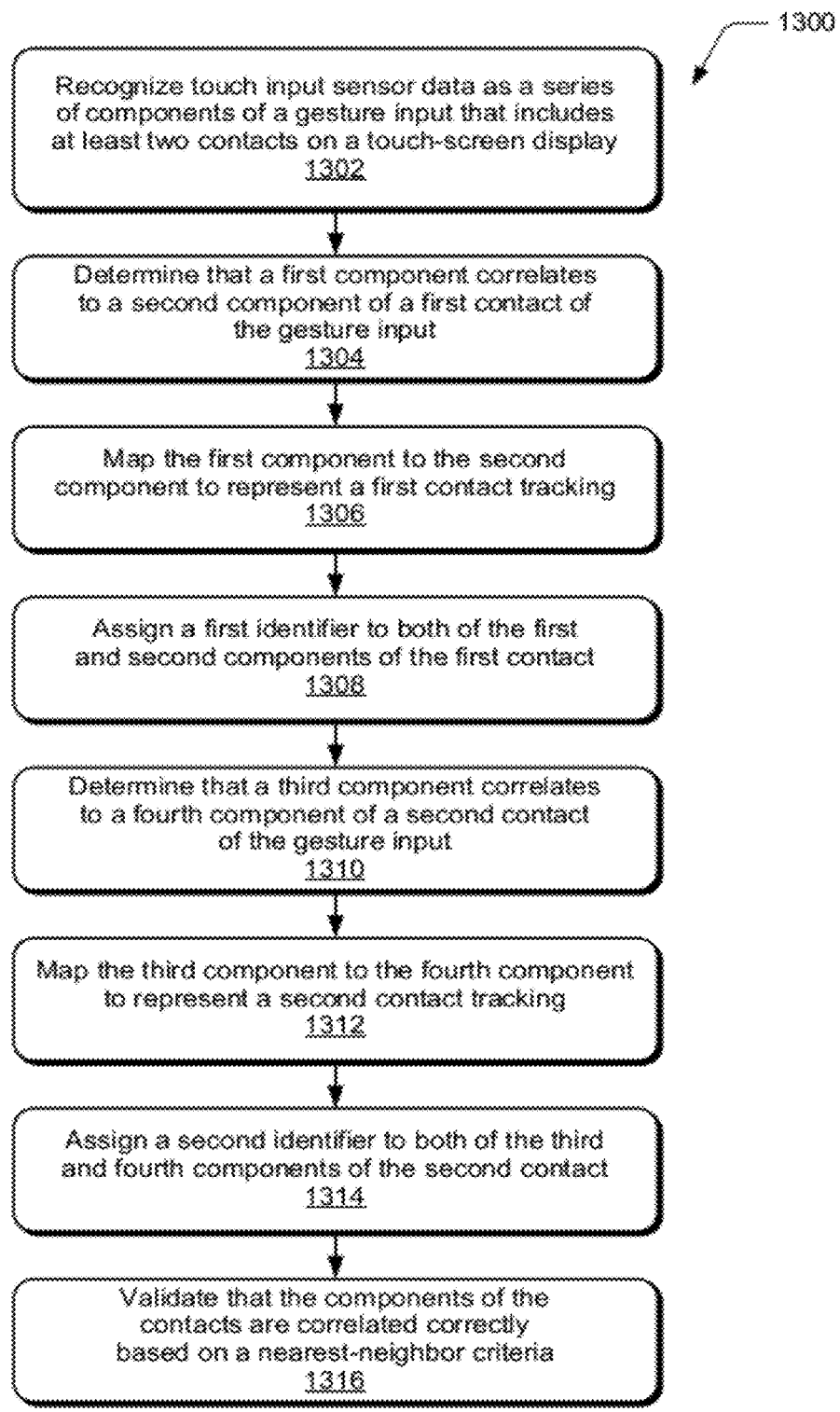
FIG. 13 illustrates example method(s) of prediction-based touch contact tracking in accordance with one or more embodiments.

FIG. 13 illustrates example method(s) 1300 of prediction-based touch contact tracking, such as for multiple contacts of a gesture input. The order in which the method blocks are described are not intended to be construed as a limitation, and any number of the described method blocks can be combined in any order to implement a method, or an alternate method.

At block 1302, touch input sensor data is recognized as a series of components of a gesture input that includes at least two contacts on a touch-screen display. For example, the touch input module 114 (FIG. 1) at the computing device 102 recognizes the touch input sensor data 116 as a series of components of the gesture input 112 that includes the two contacts 122, 124 on the touch-screen display 110, such as on the example device 104. In this example, a user initiates a two-finger gesture input that includes the first contact 122 and includes the second contact 124.

At block 1304, a first component is determined as correlating to a second component of a first contact of the gesture input. At block 1306, the first component is mapped to the second component to represent a first contact tracking. At block 1308, a first identifier is assigned to both of the first and second components of the first contact. For example, the contact tracking service 142 (FIG. 1) at the computing device 102 determines that the first component 126 correlates to the second component 128 of the first contact 122 of the gesture input 112, maps the first component to the second component to represent a tracking of the first contact, and assigns an identifier to both of the first and second components of the first contact.

At block 1310, a third component is determined as correlating to a fourth component of a second contact of the gesture input. At block 1312, the third component is mapped to the fourth component to represent a second contact tracking. At block 1314, a second identifier is assigned to both of the third and fourth components of the second contact. For example, the contact tracking service 142 (FIG. 1) at the computing device 102 predicts that the component 132 correlates to the component 134 of the second contact 124 of the gesture input 112, maps the components to represent a tracking of the second contact, and assigns a second, different identifier to both of the components of the second contact.

At block 1316, the components of the contacts are validated as correlating correctly based on a nearest-neighbor criteria that evaluates distance from each of the components to one or more additional components of the contacts. For example, the contact tracking service 142 validates that the components of the contacts are correlated correctly based on the nearest-neighbor contact mapping that evaluates distance from each of the components to one or more additional components of the contacts.

Figure 14:
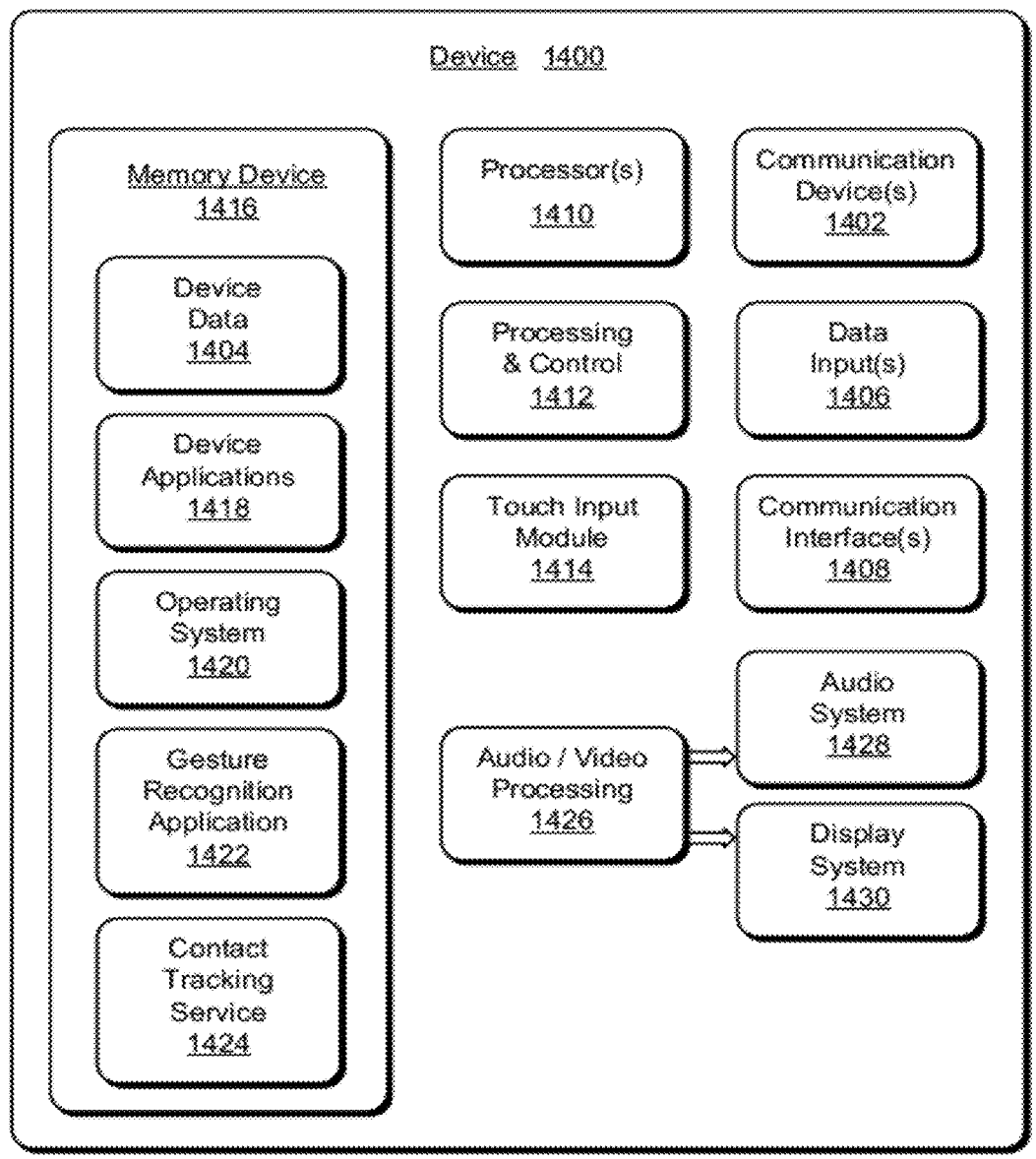
FIG. 14 illustrates various components of an example device that can implement embodiments of prediction-based touch contact tracking.

FIG. 14 illustrates various components of an example device 1400 that can be implemented as any of the devices, or services implemented by devices, described with reference to the previous FIGS. 1-13. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 1400 includes communication devices 1402 that enable wired and/or wireless communication of device data 1404, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 1406 via which any type of data, media content, and/or inputs can be received, such as user-selectable inputs and any other type of audio, video, and/or image data received from any content and/or data source.

The device 1400 also includes communication interfaces 1408, such as any one or more of a serial, parallel, network, or wireless interface. The communication interfaces provide a connection and/or communication links between the device and a communication network by which other electronic, computing, and communication devices communicate data with the device.

The device 1400 includes one or more processors 1410 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 1412. In embodiments, the device 1400 can also include a touch input module 1414 that is implemented to recognize touch input sensor data. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 1400 also includes one or more memory devices 1416 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 1416 provides data storage mechanisms to store the device data 1404, other types of information and/or data, and various device applications 1418. For example, an operating system 1420 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 1418 include a gesture recognition application 1422 and a contact tracking service 1424 that implement embodiments of angular contact geometry as described herein.

The device 1400 also includes an audio and/or video processing system 1426 that generates audio data for an audio system 1428 and/or generates display data for a display system 1430. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of prediction-based touch contact tracking have been described in language specific to features and/or methods, the subject of the appended claims is not necessarily limited to the specific features or methods described. Rather, the specific features and methods are disclosed as example implementations of prediction-based touch contact tracking.

The invention claimed is:

1. A method, comprising:
recognizing touch input sensor data as a series of sequential components of a plurality of contacts on a touchscreen display;
identifying first components of each of the contacts;
identifying second components of each of the contacts by performing operations comprising:
identifying unassociated components of the contacts;
calculating sums of maximum distances between each of the first components and each of the unassociated components, a first sum calculated based on the distances between a first one of the first components and at least two of the unassociated components, at least a second sum calculated based on the distances between a second one of the first components and the at least two unassociated components;

selecting a set of pairings of the first components and the unassociated components, a first pairing selected corresponding to a largest sum, the first pairing selected based on a minimum distance between an unassociated component and a first component of the largest sum, the pairings in the set of pairings successively selected based on a next largest sum;

identifying the second components of each of the contacts from the unassociated components based on the selected set of pairings;

for each of the contacts, performing operations comprising:

associating a first component and a second component to represent a tracking of a respective contact; and assigning a same identifier identifying a gesture to the first component and to the second component of the respective contact.

2. A method as recited in claim 1, further comprising, for each of the contacts:

determining that a subsequent component correlates to the respective contact; and assigning the same identifier to the subsequent component that combines with the first, second, and subsequent components to represent the tracking of the respective contact corresponding to the gesture.

3. A method as recited in claim 2, wherein the determining that the subsequent component correlates to the respective contact comprises:

predicting a component position of the subsequent component from the tracking of the contact;

correlating the predicted component position to the subsequent component;

validating that the predicted component position correlates to the subsequent component based on a nearest-neighbor contact mapping criteria; and associating the subsequent component with the same identifier identifying the gesture based on the validation.

4. A method as recited in claim 3, wherein the nearest-neighbor contact mapping criteria evaluates distance from the predicted component position to one or more components of the contact.

5. A method as recited in claim 3, further comprising merging multiple contacts that alias to a single unassociated component into the single unassociated component.

6. A method as recited in claim 5, wherein said merging comprises determining an unreliable association of the components after the nearest-neighbor contact mapping, the unreliable association based on a total number of the unassociated components being greater than a difference between a number of the components and a number of the contacts.

7. A computing device, comprising:
a touch-screen display;
a touch input module configured to recognize two-dimensional touch input sensor data from a touch sensor array;
at least a memory and a processor to implement a contact tracking service configured to:
convert the two-dimensional touch input sensor data from the touch sensor array into a sequential series of components of a plurality of contacts on the touch-screen display;

identify first components of each of the contacts;
identify second components of each of the contacts by the contact tracking service further configured to:
identify unassociated components of the contacts;
calculate sums of maximum distances between each of the first components and each of the unassociated components, a first sum calculated based on the distances between a first one of the first components and at least two of the unassociated components, at least a second sum calculated based on the distances between a second one of the first components and the at least two unassociated components;

select a set of pairings of the first components and the unassociated second components, a first pairing selected corresponding to a largest sum, the first pairing selected based on a minimum distance between an unassociated component and a first component of the largest sum, the pairings in the set of pairings successively selected based on a next largest sum;

identify the second components of each of the contacts from the unassociated components based on the selected set of pairings;

for each of the contacts, the contact tracking service further configured to:

associate a first component and a second component to represent a tracking of a respective contact; and assign a same identifier to the first component and to the second component of the respective contact as corresponding to a gesture.

8. A computing device as recited in claim 7, wherein, for each of the contacts, the contact tracking service is further configured to:

determine that an additional component correlates to the respective contact; and assign the same identifier to the additional component that represents the tracking of the respective contact corresponding to the gesture.

9. A computing device as recited in claim 8, wherein, to determine that the additional component correlates to the respective contact, the contact tracking service is further configured to:

predict a component position of the additional component from the tracking of the contact, the tracking associated with the first and second components;

correlate the predicted component position to the additional component;

validate that the predicted component position correlates to the additional component based on a nearest-neighbor contact mapping criteria; and associate the additional component of the contact with the same identifier as corresponding to the gesture based on the validation.

10. A computing device as recited in claim 9, wherein the nearest-neighbor contact mapping criteria evaluates distance from the predicted component position to one or more components of the contact.

11. A computing device as recited in claim 9, wherein the contact tracking service is further configured to merge multiple contacts that alias to a single unassociated component into the single unassociated component.

12. A computing device as recited in claim 11, wherein, to merge the multiple contacts that alias to the single unassociated component, the contact tracking service is further configured to determine an unreliable association of the components after the nearest-neighbor contact mapping, the unreliable association based on a total number of the unassociated components being greater than a difference between a number of the components and a number of the contacts.

13. A computing device, comprising:
- a touch input module configured to receive touch input sensor data as a sequential series of components of a plurality of contacts for a gesture input on a touch screen display;
- a contact tracking service configured to generate a normalized two-dimensional grid of the touch input sensor data;
- a memory and processor system configured to implement the contact tracking service and components of a contact tracking service, comprising:
  - a connected components analyzer configured to generate an array of connected components that represent the plurality of contacts for the gesture input, the array generated based on an input of the normalized two-dimensional grid; and
  - a touch contact tracker module configured to:
    - associate the connected components of each contact with previous contacts representing continuous contact traces of the gesture input;
    - calculate sums of maximum distances between the connected components and previous components of the previous contacts, a first sum calculated based on the distances between a first one of the previous components and at least two of the connected components, at least a second sum calculated based on the distances between a second one of the previous components and the at least two connected components;
    - select a set of pairings of the connected components and the previous components, a first pairing selected corresponding to a largest sum, the first pairing selected based on a minimum distance between a connected component and a previous component of the largest sum, the pairings in the set of pairings successively selected based on a next largest sum; and
    - associate the connected components of each contact with the previous components based on the selected set of pairings.

14. A computing device as recited in claim 13, wherein the touch contact tracker module is configured to assign a same identifier to the associated connected components of each contact with the previous components of the previous contacts to represent the continuous contact traces of the gesture input.

15. A computing device as recited in claim 13, wherein the touch contact tracker module is configured to associate the connected components of each contact with the previous contacts based on a nearest-neighbor contact mapping criteria that is utilized to evaluate distance from a previous component position to a connected component position.

16. A computing device as recited in claim 13, wherein the touch contact tracker module is configured to merge multiple contacts that alias to a single component that represents multiple contact traces of the gesture input.

* * * * *